US012498047B2

(12) United States Patent
Feng et al.

(10) Patent No.: US 12,498,047 B2
(45) Date of Patent: Dec. 16, 2025

(54) DRIVER AND CONTROL VALVE

(71) Applicant: ZHEJIANG DUNAN ARTIFICIAL ENVIRONMENT CO., LTD., Shaoxing (CN)

(72) Inventors: Zhongbo Feng, Shaoxing (CN); Junjie Wang, Shaoxing (CN); Fugang Wang, Shaoxing (CN); Haijian Sha, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 107 days.

(21) Appl. No.: 18/542,610

(22) Filed: Dec. 16, 2023

(65) Prior Publication Data
US 2024/0117885 A1 Apr. 11, 2024

Related U.S. Application Data

(63) Continuation of application No. PCT/CN2022/101009, filed on Jun. 24, 2022.

(30) Foreign Application Priority Data

Jun. 24, 2021 (CN) .......................... 202110705636.6
Jun. 24, 2021 (CN) .......................... 202121414376.9
(Continued)

(51) Int. Cl.
*F16K 11/085* (2006.01)
*F16K 31/04* (2006.01)
*F16K 31/53* (2006.01)

(52) U.S. Cl.
CPC ............ *F16K 11/085* (2013.01); *F16K 31/04* (2013.01); *F16K 31/041* (2013.01); *F16K 31/53* (2013.01); *F16K 31/535* (2013.01)

(58) Field of Classification Search
CPC ............... F16K 11/085; F16K 11/0856; F16K 11/0876; F16K 11/22; F16K 11/202;
(Continued)

(56) References Cited

U.S. PATENT DOCUMENTS 4,345,622 A * 8/1982 Henningsson ........ F16K 11/202
137/637.1
4,655,252 A * 4/1987 Krumhansl ......... F16K 11/0853
251/59
(Continued)

FOREIGN PATENT DOCUMENTS

CN 103574094 A 2/2014
CN 106574543 A 4/2017
(Continued)

OTHER PUBLICATIONS

International Search Report of PCT/CN2022/101009, dated Aug. 31, 2022, 11 pages.
(Continued)

*Primary Examiner* — David Colon-Morales

(57) ABSTRACT

A driver and a control valve are provided. The control valve includes a valve body, a first valve core and a second valve core. The valve body provided with a valve cavity. A side wall of the valve body is provided with a plurality of communicating holes, and the communicating hole penetrates through the side wall of the valve body and is in communicate with the valve cavity. The first valve core is rotatably disposed at one end of the valve cavity, the first valve core is provided with a plurality of first passages and a plurality of second passages on a circumferential side of the first valve core. The second valve core is rotatably disposed at the other end of the valve cavity, and the second
(Continued)

valve core is coaxially disposed with the first valve core, and the second valve core is coaxially disposed with the first valve core.

19 Claims, 19 Drawing Sheets

(30) Foreign Application Priority Data

Feb. 25, 2022 (CN) .......................... 202210181970.0
Feb. 25, 2022 (CN) .......................... 202220405860.3

(58) Field of Classification Search
CPC ...... F16K 31/535; F16K 31/53; F16K 31/043; F16K 31/041; F16K 31/04; F16K 27/065
See application file for complete search history.

(56) References Cited

U.S. PATENT DOCUMENTS

| | | | |
|---|---|---|---|
| 9,404,594 B2* | 8/2016 | Morein | F16K 11/0856 |
| 10,240,682 B2* | 3/2019 | Lou | F01P 7/14 |
| 10,330,208 B2* | 6/2019 | Takamatsu | F16K 27/06 |
| 10,344,883 B2* | 7/2019 | Brazas | F16K 11/0876 |
| 10,544,725 B2* | 1/2020 | Schaefer | F16K 11/0876 |
| 11,333,258 B2* | 5/2022 | Sato | F16K 31/535 |
| 11,867,299 B2* | 1/2024 | Kanki | F01P 3/02 |
| 2016/0040585 A1 | 2/2016 | Schaefer | |
| 2018/0372235 A1* | 12/2018 | Smith | F16K 27/065 |
| 2019/0024815 A1 | 1/2019 | Lou | |
| 2020/0393053 A1* | 12/2020 | Dragojlov | F16K 27/067 |
| 2021/0341063 A1* | 11/2021 | Chen | F16K 27/065 |

FOREIGN PATENT DOCUMENTS

| | | | | |
|---|---|---|---|---|
| CN | 112302784 A | 2/2021 | | |
| CN | 212690926 U | 3/2021 | | |
| CN | 112879601 A | 6/2021 | | |
| CN | 215928493 U | 3/2022 | | |
| DE | 102018009680 A1 * | 6/2020 | ............... | F01P 7/14 |
| DE | 102018009680 A9 | 10/2020 | | |
| DE | 102020207303 A1 * | 12/2020 | ............... | F01P 7/14 |
| DE | 102021202181 A1 * | 9/2022 | ............. | F01P 7/165 |
| JP | 2019211064 A | 12/2019 | | |
| KR | 20210056729 A | 5/2021 | | |

OTHER PUBLICATIONS

European search report of EP22827685.3, dated Sep. 11, 2024, 7 pages.
Notice of Reasons for Refusal of JP2023-562829, dated Nov. 27, 2024, 10 pages.

* cited by examiner

DRIVER AND CONTROL VALVE

CROSS-REFERENCE TO RELATED APPLICATIONS

This application is a continuation of international patent application No. PCT/CN2022/101009, filed on Jun. 24, 2022, which itself claims priority to Chinese patent application Nos. 202110705636.6, filed on Jun. 24, 2021, and titled "CONTROL VALVE"; 202121414376.9, filed on Jun. 24, 2021, and titled "CONTROL VALVE"; 202210181970.0, filed on Feb. 25, 2022, and titled "DRIVER AND CONTROL VALVE HAVING SAME"; 202220405860.3, filed on Feb. 25, 2022, and titled "DRIVER AND CONTROL VALVE HAVING THE SAME". The content of the above identified application is hereby incorporated herein in their entireties by reference.

TECHNICAL FIELD

The present disclosure relates to the field of fluid control technology, and in particular, to a driver and a control valve.

BACKGROUND

In the technical field of fluid control, multi-channel control valves are used to control a flow path, so that the control valves can form different communication modes. At present, some control valves are relatively simple in structure, but they have fewer communication modes, and a number of communication modes are less than 10, which makes it difficult to meet the needs of more communication modes. Some control valves have more communication modes, but their volume is large, which is not conducive to a miniaturization of control valves.

SUMMARY

According to various embodiments of the present application, a driver and a control valve are provided.

The present disclosure provides a driver and a control valve. The control valve includes a valve body, a first valve core and a first valve core. The valve body is provided with a valve cavity, a plurality of communicating holes are provided in a side wall of the valve body, the plurality of communicating holes penetrate through the side wall of the valve body and are in communication with the valve cavity. The first valve core is rotatably disposed at one end of the valve cavity, the first valve core is provided with a plurality of first passages and a plurality of second passages on a circumferential side of the first valve core. The second valve core is rotatably disposed at the other end of the valve cavity, and the second valve core is coaxially disposed with the first valve core, the second valve core is provided with a third passage. The plurality of communicating holes includes a plurality of first flow channels and a plurality of second flow channels. On a condition that the first valve core is rotated by a first predetermined angle, each of the plurality of first passages is capable of being in communication with corresponding two of the plurality of first flow channels and each of the plurality of second passages is capable of being in communication with corresponding one of the plurality of first flow channels. On a condition that the second valve core is rotated by a second predetermined angle, the third passage is capable of being in communication with one or two of the plurality of second flow channels and the third passage is capable of being correspondingly in communication with the plurality of second passages, so that one of the plurality of first flow channels is correspondingly in communication with one or two of the plurality of second flow channels through the plurality of second passages and the third passage.

Details of one or more embodiments of this application are presented in the attached drawings and descriptions below. And other features, purposes and advantages of this application will become apparent from the description, drawings and claims.

BRIEF DESCRIPTION OF THE DRAWINGS

For a better description and illustration of embodiments and/or examples of those inventions disclosed herein, reference may be made to one or more attached drawings. Additional details or examples used to describe the drawings should not be considered as limiting the scope of any of the disclosed inventions, currently described embodiments and/or examples, and currently understood best modes of these inventions.

Figure 1:
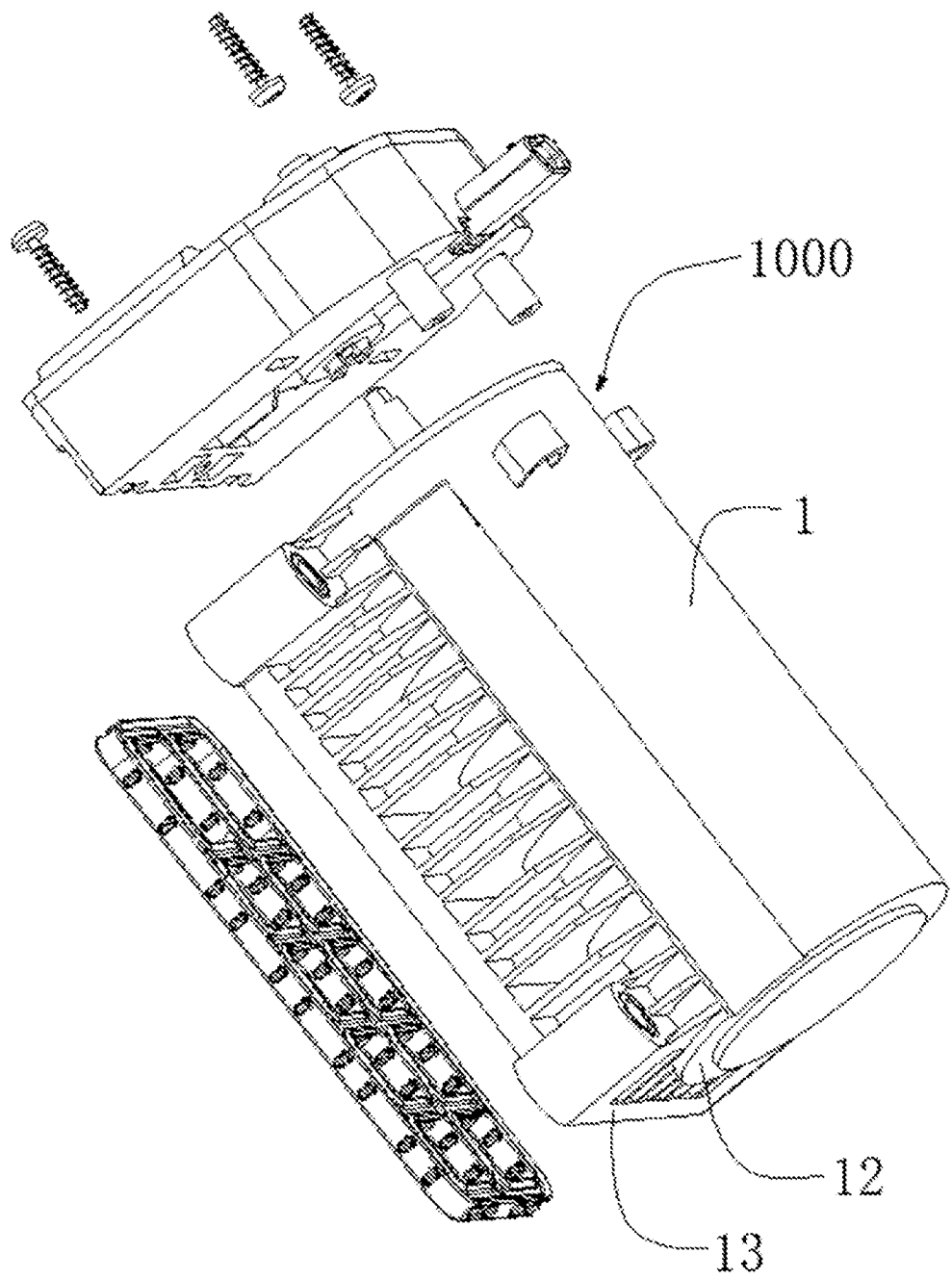
FIG. 1 is a first exploded schematic view of a control valve according to an embodiment of the present disclosure.

Reference signs are as follows: 1 represents a valve body; 11 represents a valve cavity; 12 represents a side wall portion; 121 represents a communicating hole; 121a represents a first flow channel; 121b represents a second flow channel; 13 represents a mounting portion; 131 represents a mounting plane; 132 represents a valve port; 14 represents a body section; 141 represents an assembly port; 15 represents a valve bonnet; 2 represents a first valve core; 21 represents a first passage; 211 represents an axial two-way slot; 212 represents a circumferential two-way slot; 22 represents a second passage; 22a represents a first connecting port; 22b represents a second connecting port; 23 represents a cut-off groove; 24 represents a first fan-shaped section; 25 represents a second fan-shaped section; 26 represents a third fan-shaped section; 27 represents a fourth fan-shaped section; 28 represents a fifth fan-shaped section; 3 represents a second valve core; 31 represents a third passage; 32 represents a side plate; 321 represents an open hole; 33 represents an end plate; 331 represents an opening; 34 represents an accommodating cavity; 4 represents a sealing gasket; 41 represents a notch; 5 represents a sealing cylinder; 51 represents a sealing block; 52 represents a rubber ring; 53 represents a metal elastic piece; 60 represents a driver; 61 represents a first transmission shaft; 611 represents a fourth fitting portion; 611a represents a fourth protrusion; 62 represents a second transmission shaft; 621 represents a third fitting portion; 622 represents a third groove; 70 represents an actuator mechanism; 7 represents a first actuator assembly; 71 represents a first motor component; 711 represents a first motor; 712 represents a first worm; 713 represents a first magnetic ring; 72 represents a first reducer component; 721 represents a first worm gear; 722 represents a first secondary gear; 722a represents a first large-diameter gear; 722b represents a first small-diameter gear; 723 represents a first connecting gear; 724 represents a first output gear; 724a represents a first gear portion; 724b represents a first connecting portion; 725 represents a first fitting portion; 725a represents a first groove; 8 represents a second actuator assembly; 81 represents a second motor component; 811 represents a second motor; 812 represents a second worm; 813 represents a second magnetic ring; 82 represents a second reducer component; 821 represents a second worm gear; 822 represents a second secondary gear; 822a represents a second large-diameter gear; 822b represents a second small-diameter gear; 823 represents a second connecting section; 824 represents a second output gear; 824a represents a second gear portion; 824b represents a second connecting portion; 825 represents a second fitting portion; 825a represents a second protrusion; 9 represents a housing; 91 represents a transmission hole; 92 represents a cavity; 100 represents a first sealing ring; 101 represents a second sealing ring; 1000 represents a control valve; 4000 represents an output wheel; 5000 represents a circuit board; 5100 represents a positive wire; 5200 represents a negative wire; and 6000 represents a valve core assembly.

DETAILED DESCRIPTION

Referring to FIG. 1 to FIG. 7, the present disclosure provides a control valve 1000. The control valve 1000 includes a valve body 1, a first valve core 2 and a second valve core 3. The valve body 1 provided with a valve cavity 11. The valve body 1 includes a body section 14 and a valve bonnet 15. The body section 14 is provided with an assembly port 141, and the valve bonnet 15 is covered at the assembly port 141 and detachably connected with the body section 14. The valve cavity 11 is located in the body section 14, and the first valve core 2 and the second valve core 3 are installed in the valve cavity 11 of the body section 14 by the assembly port 141. A side wall of the valve body 1 is provided with a plurality of communicating holes 121, and the plurality of communicating holes 121 penetrate through the side wall of the valve body 1 and are in communication with the valve cavity 11. The first valve core 2 is rotatably disposed at one end of the valve cavity 11, the second valve core 3 is rotatably disposed at the other end of the valve cavity 11, and the second valve core 3 is coaxially disposed with the first valve core 2.

Figure 9:
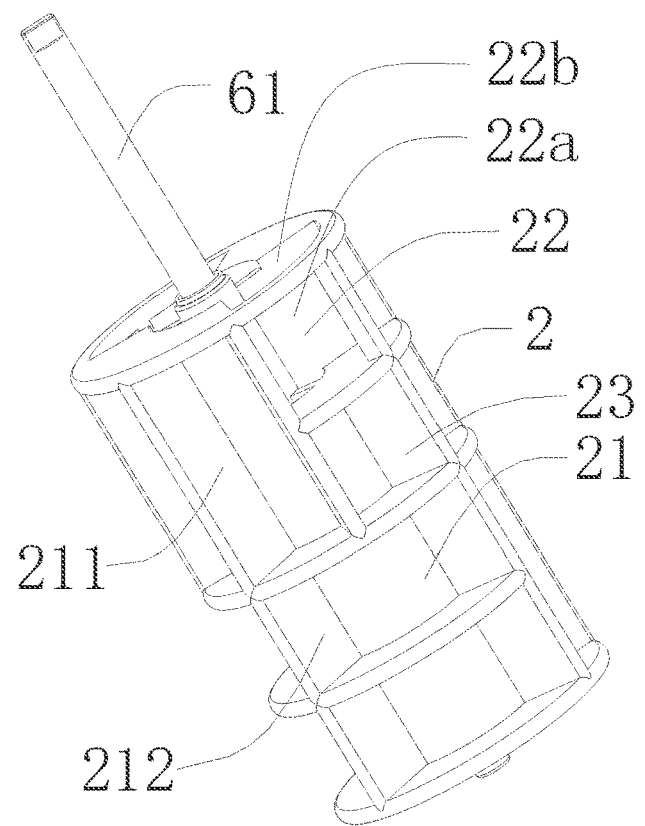
FIG. 9 is a schematic view of a first valve core according to an embodiment of the present disclosure.
Figure 10:
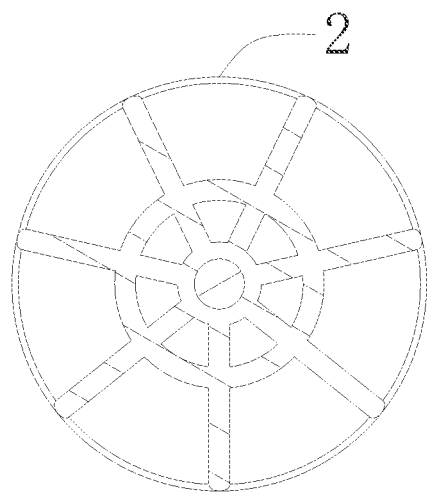
FIG. 10 is a first sectional view of a first valve core according to an embodiment of the present disclosure.
Figure 11:
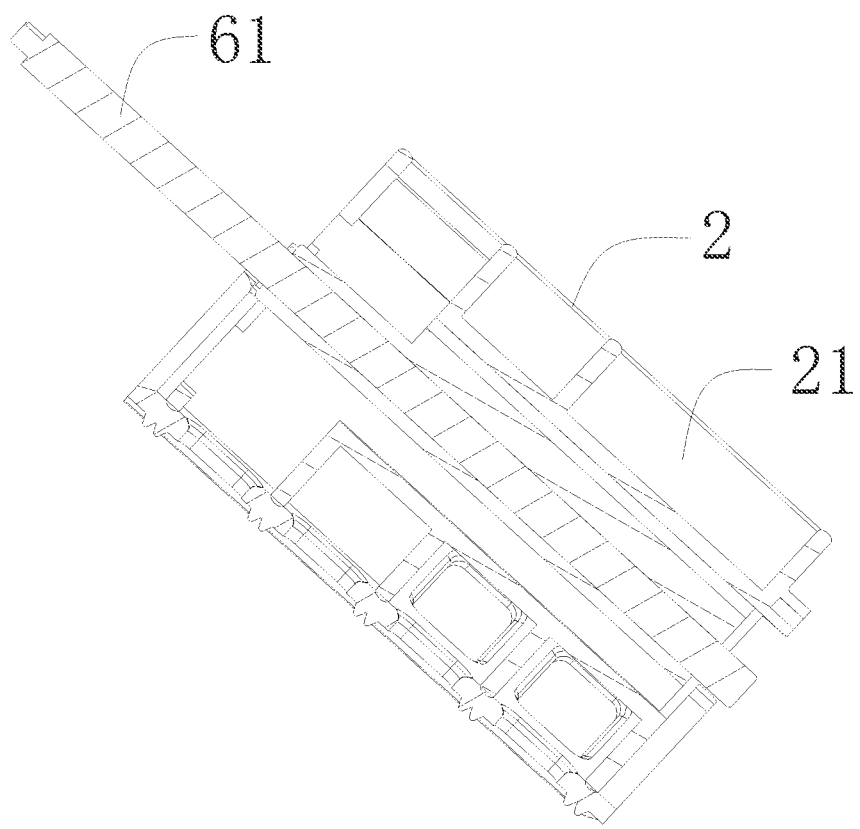
FIG. 11 is a second sectional view of a first valve core according to an embodiment of the present disclosure.
Figure 14:
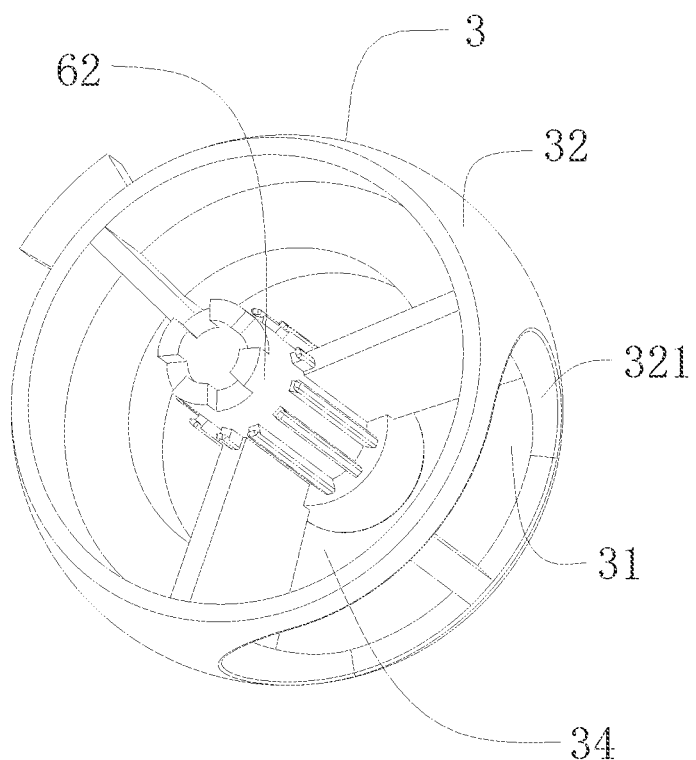
FIG. 14 is a schematic view of a second valve core according to an embodiment of the present disclosure.
Figure 20:
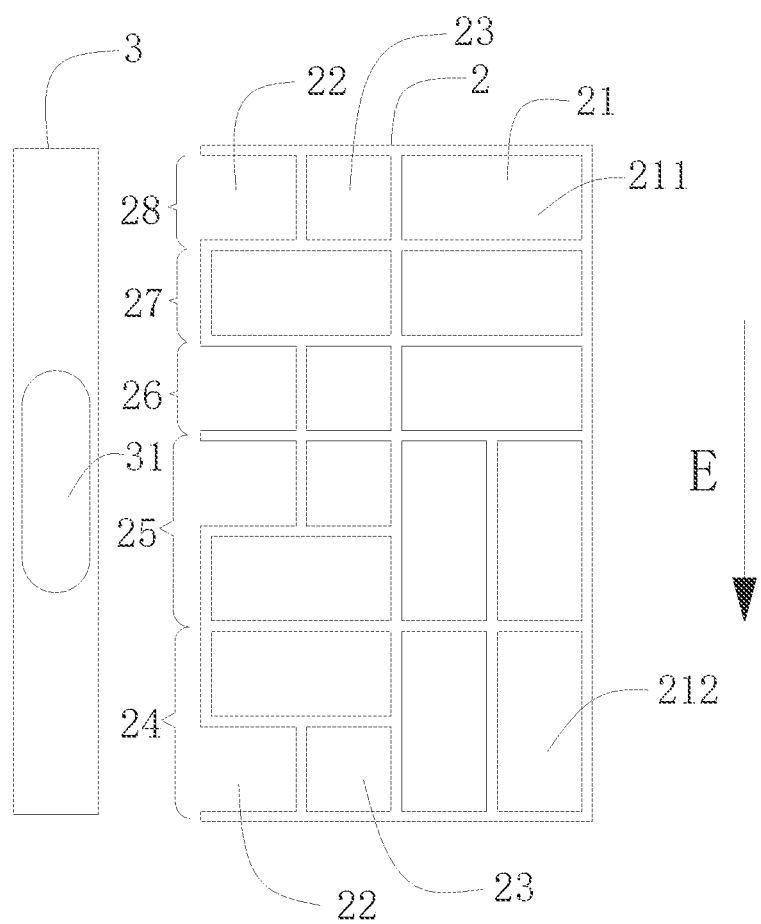
FIG. 20 is a schematic side view of a first valve core and a second valve core in a circumferential direction according to an embodiment of the present application.

Referring to FIGS. 9, 14 and 20, the first valve core 2 is provided with a plurality of first passages 21 and a plurality of second passages 22 on a circumferential side of the first valve core 2. The second valve core 3 is provided with a third passage 31. The plurality of communicating holes 121 includes a plurality of first flow channels 121a and a plurality of second flow channels 121b. On a condition that the first valve core 2 is rotated by a first predetermined angle, each of the plurality of first passages 21 is capable of being in communication with corresponding two of the plurality of first flow channels 121a and each of the plurality of second passages 22 is capable of being in communication with corresponding one of the plurality of first flow channels 121a. On a condition that the second valve core 3 is rotated by a second predetermined angle, the third passage 31 is capable of being in communication with one or two of the plurality of second flow channels 121b and the third passage 31 is capable of being correspondingly in communication with the second passages 22, so that one of the plurality of first flow channels 121a is correspondingly in communication with one or two of the plurality of second flow channels 121b through the second passages 22 and the third passage 31.

Since the control valve 1000 includes the first valve core 2 and the second valve core 3 which are coaxially arranged, the first valve core 2 and the second valve core 3 can be rotated at different angles, so that the control valve 1000 can form a variety of different communication modes. Therefore, assuming that the first valve core 2 can have a communication modes by rotating at different angles, and the second valve core 3 can have b communication modes by rotating at different angles, the entire control valve 1000 can have a*b communication modes.

The communication mode includes a two-way flow path or a three-way flow path formed at different positions of the control valve 1000. The two-way flow path refers to a fluid path including one inlet and one outlet, and three-way flow path refers to a fluid path including one inlet and two outlets, or two inlets and one outlet.

The first passage 21 of the first valve core 2 can be correspondingly in communication with two of the plurality of first flow channels 121a of the valve body 1, so that the control valve 1000 forms one or more two-way flow paths, that is, in the two-way flow path, a fluid can enter the control valve 1000 from one of the two of the plurality of first flow channels 121a, and flow out of the control valve 1000 from the other one of the two of the plurality of first flow channels 121a through the first passage 21.

Furthermore, the second passage 22 can be in communication with one of the plurality of first flow channels 121a. The third passage 31 can be in communication with one or two of the plurality of the second flow channels 121b, and the third passage 31 can be in communication with the second passage 22 correspondingly. Therefore, one of the plurality of the first flow channels 121a can be in communicate with one or two of the plurality of the second flow channels 121b through the second passage 22 and the third passage 31.

When one of the plurality of the first flow channels 121a is in communication with one of the plurality of the second flow channels 121b through the second passage 22 and the third passage 31, the control valve 1000 has two-way flow path. That is, the fluid can enter the control valve 1000 from one of the plurality of the first flow channels 121a and enter one of the plurality of the second flow channels 121b through the second passage 22 and the third passage 31 in turn, and finally leave the control valve 1000 through the plurality of second flow channels 121b. Alternatively, the fluid can enter the control valve 1000 from one of the plurality of the second flow channels 121b and enter the first flow channel 121a through the third passage 31 and the second passage 22 in turn, and finally leave the control valve 1000 through the plurality of first flow channels 121a.

When one of the plurality of the first flow channels 121a is in communication with two of the plurality of the second flow channels 121b through the second passage 22 and the third passage 31, the control valve 1000 has a three-way flow path. That is, the fluid can enter the control valve 1000 from the plurality of first flow channels 121a, and enter the plurality of second flow channels 121b through the second passage 22 and the third passage 31 in turn, and finally leave the control valve 1000 through two of the plurality of second flow channels 121b. Alternatively, the fluid can enter the control valve 1000 from two of the plurality of second flow channels 121b and enter the plurality of first flow channels 121a through the third passage 31 and the second passage 22 in turn, and finally leave the control valve 1000 through the plurality of first flow channels 121a. Alternatively, the fluid can enter the control valve 1000 from one of the plurality of first flow channels 121a and one of the plurality of second flow channels 121b, and finally leave the control valve 1000 through another of the plurality of second flow channels 121b. Alternatively, the fluid can enter the control valve 1000 from one of the plurality of second flow channels 121b, and finally leave the control valve 1000 through one of the plurality of first flow channels 121a and another of the plurality of second flow channels 121b.

From the above, it can be seen that the control valve 1000 provided can have more communication modes than the existing control valve with a single valve core structure. And because the first valve core 2 and the second valve core 3 of the control valve 1000 are arranged in the same valve cavity 11 of the valve body 1, and the first valve core 2 and the second valve core 3 are coaxially arranged, therefore, the control valve 1000 of the present disclosure is more compact in structure and smaller in volume than the existing control valve.

Figure 5:
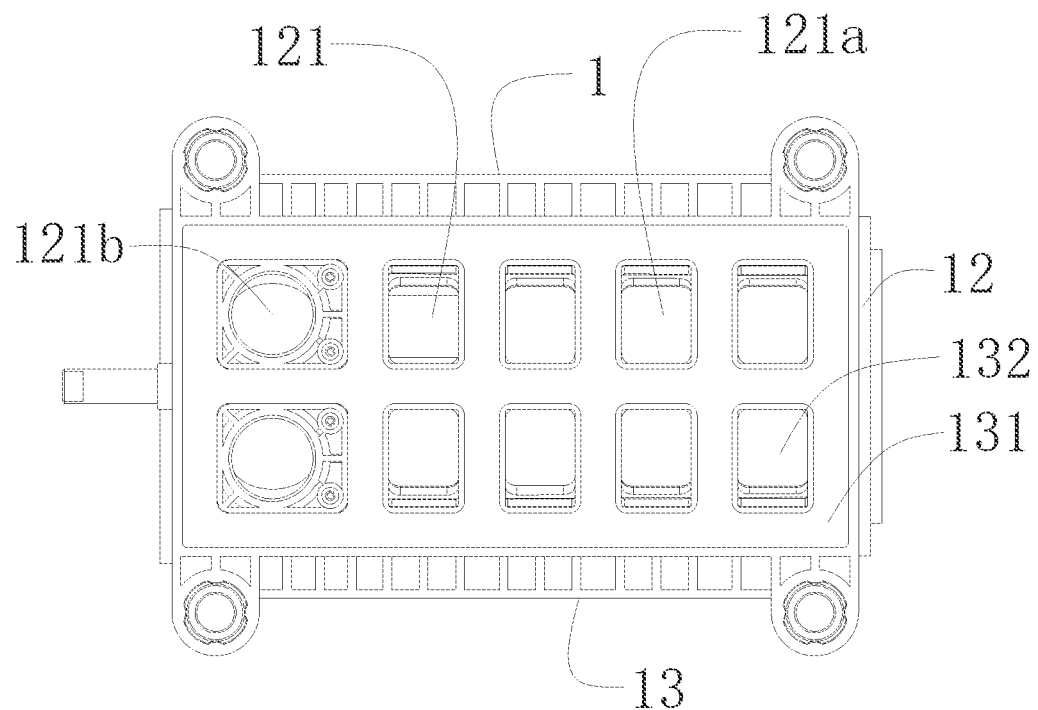
FIG. 5 is a side view of the control valve in FIG. 4.
Figure 6:
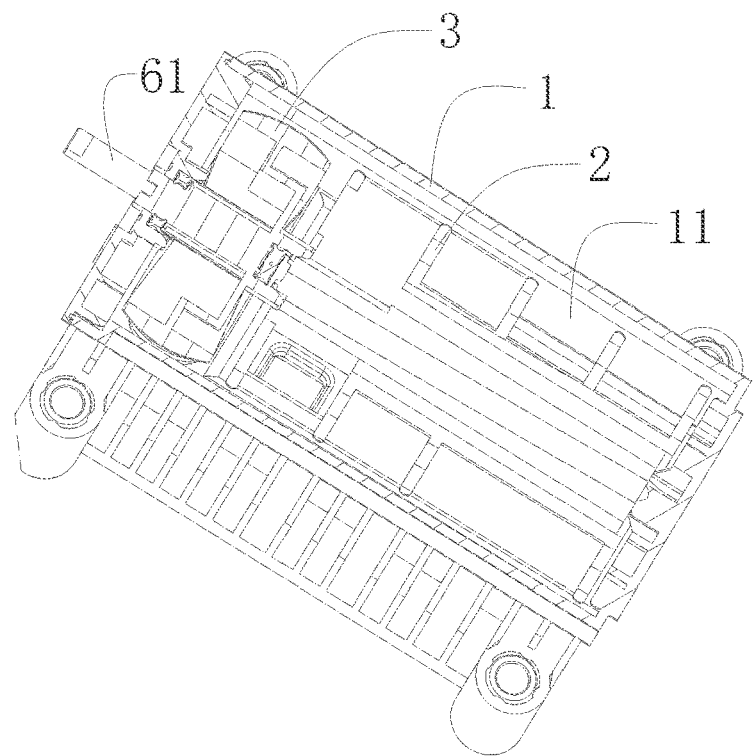
FIG. 6 is a sectional view of the control valve in FIG. 4.
Figure 7:
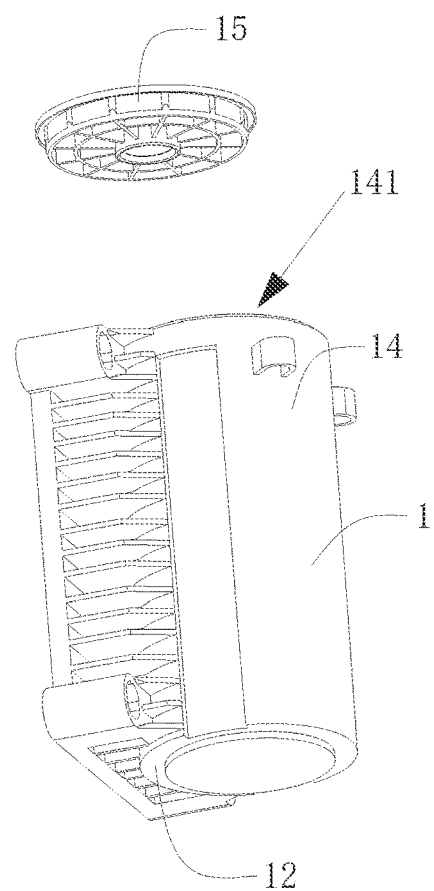
FIG. 7 is an exploded schematic view of a valve body according to an embodiment of the present disclosure.

In an embodiment, referring to FIG. 5, the control valve 1000 includes the plurality of first flow channels the number of which is 2n, wherein n is greater than or equal to 2. The control valve 1000 includes two second flow channels. Each of the plurality of first passages 21 is capable of being in communication with different two of the plurality of first flow channels 121a to form less than or equal to n−1 two-way flow paths, and one of the plurality of first flow channels 121a is capable of being in communication with one of the plurality of second flow channels 121b through corresponding one of the plurality of second passages 22 and the third passage 31 to form a two-way flow path. Alternatively, each of the plurality of first passages 21 is capable of being in communication with different two of the plurality of first flow channels 121a to form less than or equal to n−1 two-way flow paths, and one of the plurality of first flow channels 121a is capable of being in communication with two of the plurality of second flow channels 121b through corresponding one of the plurality of second passages 22 and the third passage 31 to form a three-way flow path. In this way, the plurality of communicating holes 121 installed in the valve body 1 can be used to the maximum extent, so as to increase the number of two-way flow paths that can be formed on the control valve 1000 and increase a utilization rate of the control valve 1000.

Furthermore, referring to FIG. 5, the plurality of communicating holes 121 are distributed in two rows in the valve body 1, each row of the plurality of communicating holes 121 includes n of the plurality of first flow channels 121a and one of the plurality of second flow channels 121b, and two of the plurality of second flow channels 121b corresponding to two rows are disposed at the same end of the valve body 1. In this way, the distribution of the communicating hole 121 on the valve body 1 is more reasonable and beautiful, which is beneficial to process of the communicating hole 121 on the valve body 1 and increase of a processing efficiency of the control valve 1000. Furthermore, it is not limited that, the communicating hole 121 can also be divided into three columns, four columns, five columns and other different column numbers distributed in the valve body 1, which is not listed anymore.

In an embodiment, the first valve core 2 is a columnar structure, the first valve core 2 is provided with a plurality of cut-off grooves 23, each of the plurality of the cut-off grooves 23 is capable of closing corresponding one of the plurality of first flow channels 121a. The plurality of first passages 21 includes a plurality of axial two-way slots 211 and a plurality of circumferential two-way slots 212. Each of the plurality of axial two-way slots 211 is capable of being correspondingly in communication with two of the plurality of first flow channels 121a disposed in an axial direction of the valve body 1, each of the plurality of circumferential two-way slots 212 is capable of being correspondingly in communication with two of the plurality of first flow channels 121a disposed in a circumferential direction of the valve body 1. The first valve 1 core includes a first fan-shaped section 24, a second fan-shaped section 25, a third fan-shaped section 26, a fourth fan-shaped section 27 and a fifth fan-shaped section 28 having a fan-shaped cross section and sequentially interconnected along a circumferential direction of the first valve core 1.

Illustratively, one end of the first fan-shaped section 24 away from the second valve core 3 is provided with two of the plurality of circumferential two-way slots 212 distributed along the circumferential direction of the valve body 2, and the other end of the first fan-shaped section 24 adjacent to the second valve core is provided with one of the plurality of axial two-way slots 211, one of the plurality of cut-off grooves 23, and one of the plurality of second passages 22. The one of the plurality of axial two-way slots 211 is located on a side of the first fan-shaped section 24 adjacent to the second fan-shaped section 28. Both the one of the plurality of cut-off grooves 23 and the one of the plurality of second passages 22 are located along the axial direction of the first valve core 2 and on a side of the first fan-shaped section 24 adjacent to the fifth fan-shaped section 28, and the one of the plurality of second passages 22 is adjacent to the second valve core 3. The second fan-shaped section 25 is in mirror image symmetry with the first fan-shaped section 24. The third fan-shaped section 26 is provided with one of the plurality of axial two-way slots 211, one of the plurality of cut-off grooves 23 and one of the plurality of second passages 22 in a direction from away from the second valve core 3 to towards the second valve core 3. The fourth fan-shaped section 27 is provided with two of the plurality of axial two-way slots 211 in sequence in a direction from away from the second valve core 3 to towards the second valve core 3. The fifth fan-shaped section 28 is provided with one of the plurality of axial two-way slots 211, one of the plurality of cut-off grooves 23 and one of the plurality of second passages 22 in a direction from away from the second valve 3 core to towards the second valve core 3.

Furthermore, n is 4, therefore, the control valve 1000 are provided with eight of the plurality of first flow channels 121a, and eight of the plurality of first flow channels 121a and two of the plurality of second flow channel 121b are divided into two columns, and the two columns of the plurality of communicating holes 121 are mirror images symmetry. Furthermore, in this embodiment, both the first valve core 2 and the second valve core 3 rotate in the first direction E. The cross section of the first fan-shaped section 24 corresponds to a central angle of 720°/7, the cross section of the second fan-shaped section 25 corresponds to a central angle of 720°/7, and the cross section of the third fan-shaped section 26 corresponds to a central angle of 360°/7. The cross section of the fourth fan-shaped section 27 corresponds to a central angle of 360°/7, and the cross section of the fifth fan-shaped section 28 corresponds to a central angle of 360°/7. In this way, a rotation angle of the first valve core 2 is an integer multiple of 360°/7, which is beneficial to adjustment of the first valve core 2 and reduces a difficulty of adjustment of the control valve 1000.

Figure 24:
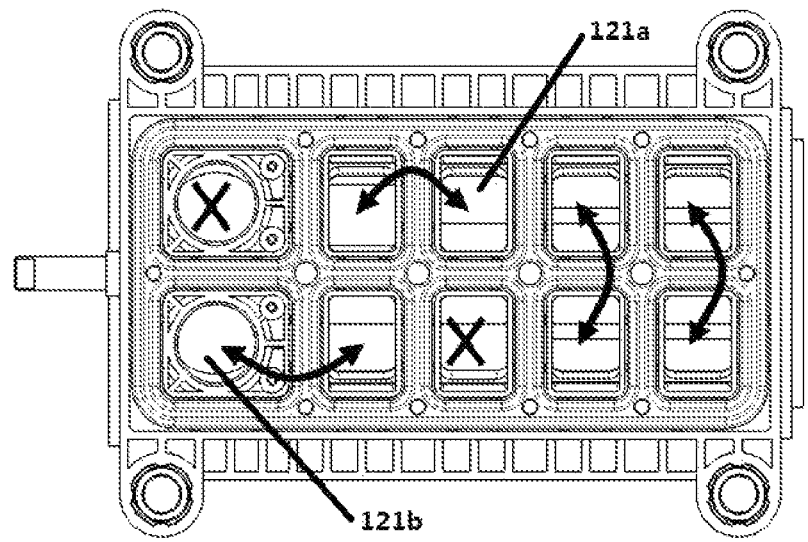
FIG. 24 is a schematic view of a control valve in a first communication mode according to an embodiment of the present application.

Referring to FIG. 24, when the control valve 1000 is in a first communication mode, the first predetermined angle is zero, the first flow channel 121a rotates to the first fan-shaped section 24, and the second predetermined angle is zero. The third passage 31 is in communication with the second flow channel 121b located below, and the third passage 31 is in communication with the second passage 22 located at the first fan-shaped section 24. A corresponding one of the first flow channels 121a, one of the second passages 22, one of the third passages 31 and one of the second flow channels 121b form a two-way flow path. Three of the first passages 21 respectively are in communication with different two of the first flow channels 121a to form three two-way flow paths, and the cut-off groove 23 correspondingly closes one of the first flow channels 121a to form a closed flow path.

Figure 25:
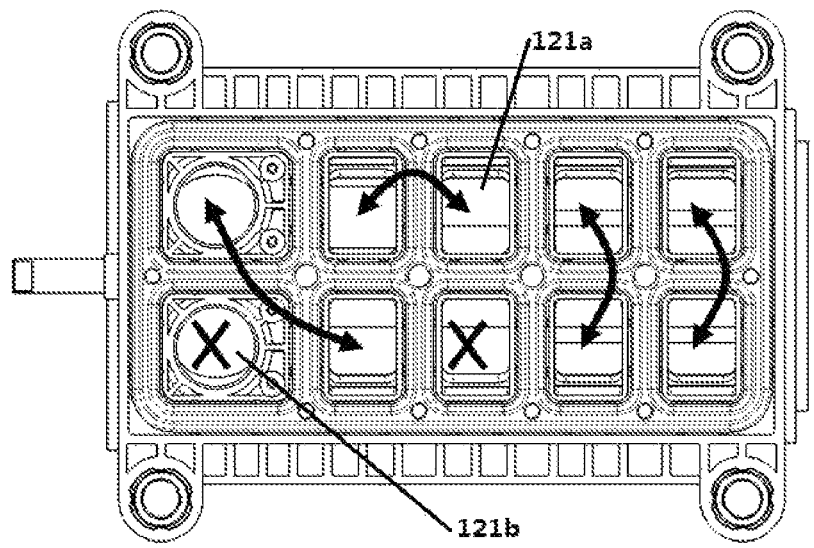
FIG. 25 is a schematic view of a control valve in a second communication mode according to an embodiment of the present application.

Referring to FIG. 25, when the control valve 1000 is in a second communication mode, the first predetermined angle is zero, the first flow channel 121a rotates to the first fan-shaped section 24, and the second predetermined angle is 120° in the first direction. The third passage 31 is in communication with the second flow channel 121b located above, and the third passage 31 is in communication with the second passage 22 located at the first fan-shaped section 24. Corresponding one of the first flow channels 121a, one of the second passages 22, one of the third passages 31 and one of the second flow channels 121b form a two-way flow path. Three of the first passages 21 are respectively in communication with different two of the first flow channels 121a to form three two-way flow paths, and the cut-off groove 23 correspondingly closes one the first flow channel 121a to form a closed flow path.

Figure 26:
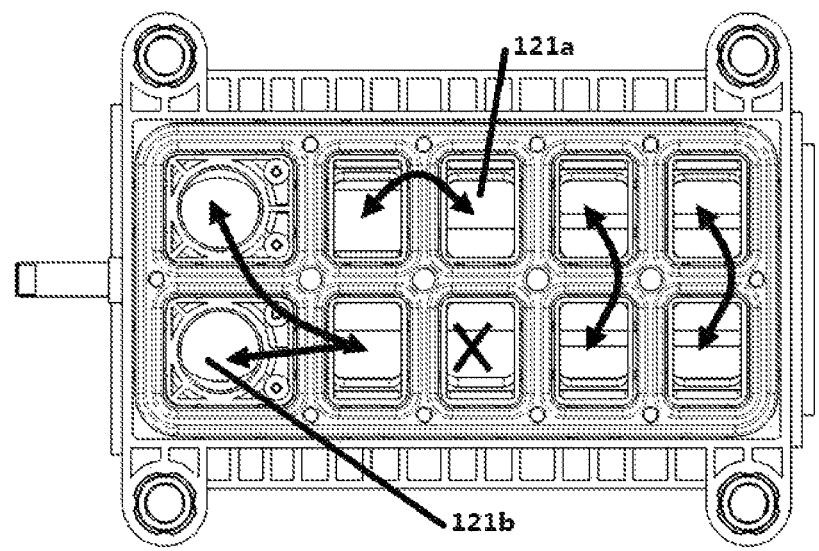
FIG. 26 is a schematic view of a control valve in a third communication mode according to an embodiment of the present application.

Referring to FIG. 26, when the control valve 1000 is in a third communication mode, the first predetermined angle is zero, the first flow channel 121a rotates to the first fan-shaped section 24, and the second predetermined angle is 60° in the first direction. The third passage 31 is in communication with two of the second flow channels 121b, and the third passage 31 is in communication with the second passage 22 located in the first fan-shaped section 24. Corresponding one of the first flow channels 121a, one of the second passages 22, one of the third passages 31 and two of the second flow channels 121b form a three-way flow path. Three of the first passages 21 are respectively in communication with different two of the first flow channels 121a to form three two-way flow paths, and the cut-off groove 23 correspondingly seals one of the first flow channels 121a to form a closed flow path.

Figure 27:
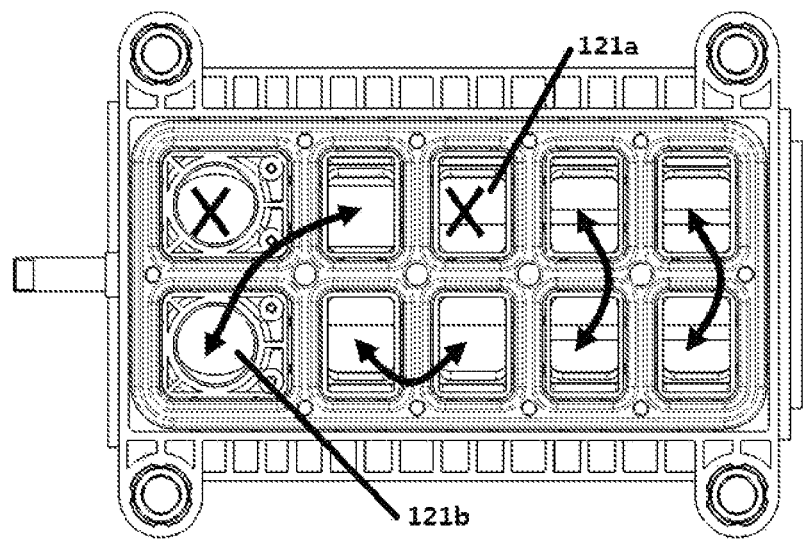
FIG. 27 is a schematic view of a control valve in a fourth communication mode according to an embodiment of the present application.

Referring to FIG. 27, when the control valve 1000 is in a fourth communication mode, the first predetermined angle is 720°/7 in the first direction, the first flow channel 121a rotates to the second fan-shaped section 25, and the second predetermined angle is zero. The third passage 31 is in communication with the second flow channel 121b located below, and the third passage 31 is in communication with the second passage 22 located in the second fan-shaped section 25. Corresponding one of the first flow channels 121a, one of the second passages 22, one of the third passages 31 and one of the second flow channels 121b form a two-way flow path. Three of the first passages 21 are respectively in communication with different two of the first flow channels 121a to form three two-way flow paths, and the cut-off groove 23 correspondingly seals one of the first flow channels 121a to form a closed flow path.

Figure 28:
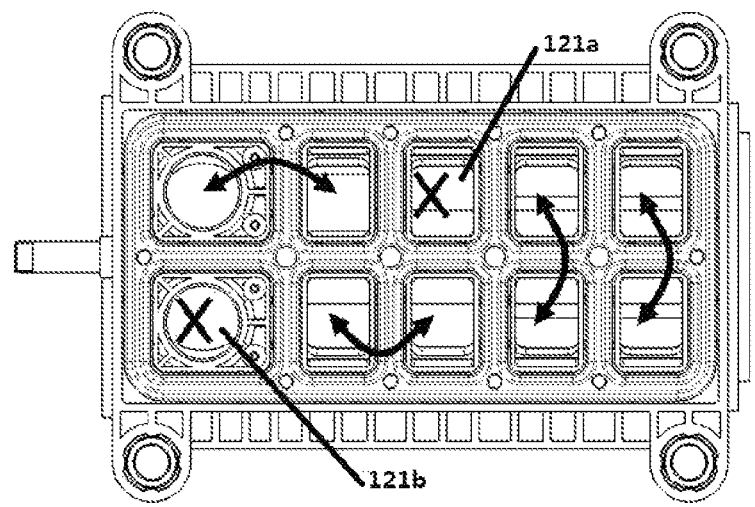
FIG. 28 is a schematic view of a control valve in a fifth communication mode according to an embodiment of the present application.

Referring to FIG. 28, when the control valve 1000 is in a fifth communication mode, the first predetermined angle is 720°/7 in the first direction, the first flow channel 121a is rotated to the second fan-shaped section 25, and the second predetermined angle is 120° in the first direction. The third passage 31 is in communication with the second flow channel 121b located above, and the third passage 31 is in communication with the second passage 22 located in the second fan-shaped section 25. Corresponding one of the first flow channels 121a, one of the second passages 22, one of the third passages 31 and one of the second flow channels 121b form a two-way flow path. Three of the first passages 21 are respectively in communication with different two of the first flow channels 121a to form three two-way flow paths, and the cut-off groove 23 correspondingly seals one of the first flow channels 121a to form a closed flow path.

Figure 29:
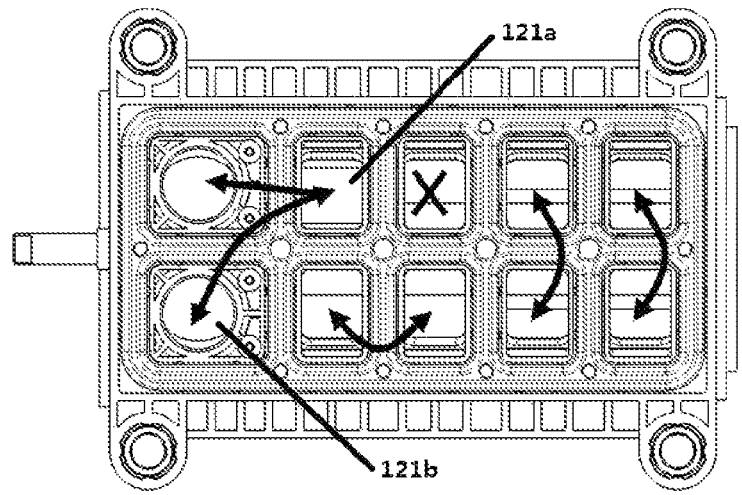
FIG. 29 is a schematic view of a control valve in a sixth communication mode according to an embodiment of the present application.

Referring to FIG. 29, when the control valve 1000 is in a sixth communication mode, the first predetermined angle is 720°/7 in the first direction, the first flow channel 121a is rotated to the second fan-shaped section 25, and the second predetermined angle is 60° in the first direction. The third passage 31 is in communication two of the second flow channels 121b, and the third passage 31 is in communication with the second passage 22 located in the second fan-shaped section 25. Corresponding one of the first flow channel 121a, one of the second passage 22, one of the third passage 31 and two of the second flow channel 121b form a three-way flow path. Three of the first passages 21 respectively are connected with different two of the first flow channels 121a to form three two-way flow paths, and the cut-off groove 23 correspondingly seals one of the first flow channels 121a to form a closed flow path.

Figure 30:
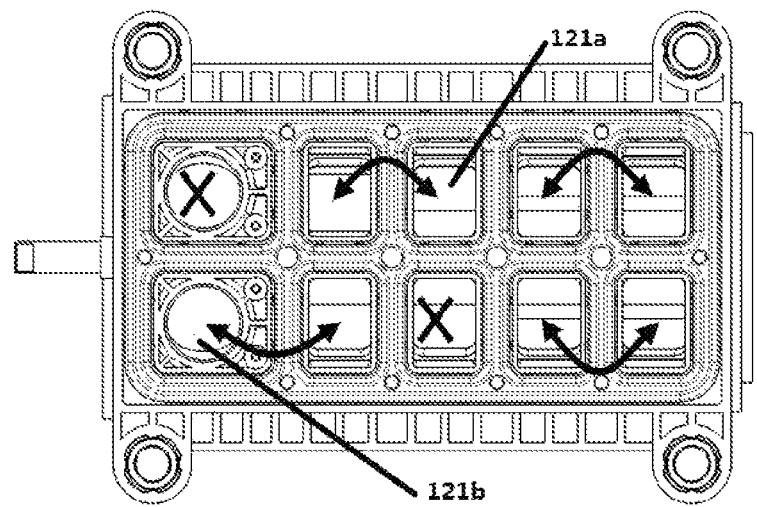
FIG. 30 is a schematic view of a control valve in a seventh communication mode according to an embodiment of the present application.

Referring to FIG. 30, when the control valve 1000 is in a seventh communication mode, the first predetermined angle is 1440°/7 along the first direction, the first flow channel 121a rotates to the third fan-shaped section 26 and the fourth fan-shaped section 27, and the second predetermined angle is zero. The third passage 31 is in communication with the second flow channel 121b located below, and the third passage 31 is in communication with the second passage 22 located in the third fan-shaped section 26. Corresponding one of the first flow channels 121a, one of the second passages 22, one of the third passages 31 and one of the second flow channels 121b form a two-way flow path. Three of the first passages 21 are respectively in communication with different two of the first flow channels 121a to form three two-way flow paths, and the cut-off groove 23 correspondingly seals one of the first flow channels 121a to form a closed flow path.

Figure 31:
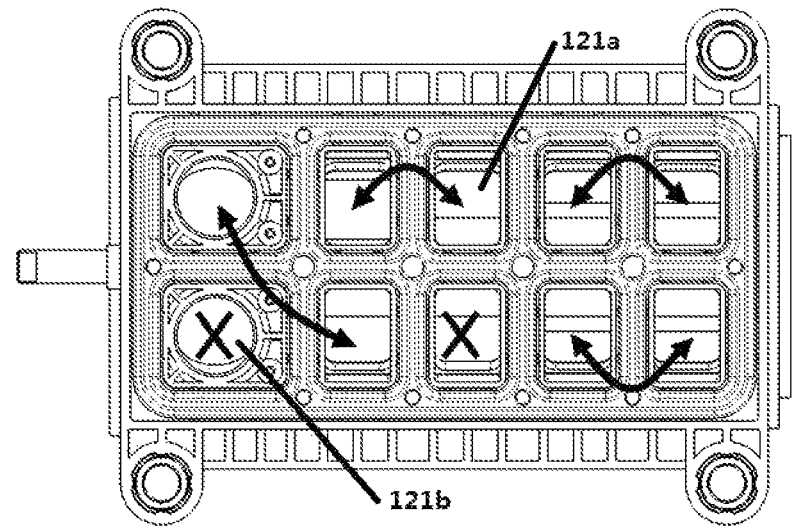
FIG. 31 is a schematic view of a control valve in an eighth communication mode according to an embodiment of the present application.

Referring to FIG. 31, when the control valve 1000 is in an eighth communication mode, the first predetermined angle is 1440°/7 in the first direction, the first flow channel 121a rotates to the third fan-shaped section 26 and the fourth fan-shaped section 27, and the second predetermined angle is 120° in the first direction. The third passage 31 is in communication with the second flow channel 121b located above, and the third passage 31 is in communication with the second passage 22 located in the third fan-shaped section 26. Corresponding one of the first flow channels 121a, one of the second passages 22, one of the third passages 31 and one of the second flow channels 121b form a two-way flow path. Three of the first passages 21 are respectively in communication with different two of the first flow channels 121a to form three two-way flow paths, and the cut-off groove 23 correspondingly seals one of the first flow channels 121a to form a closed flow path.

Figure 32:
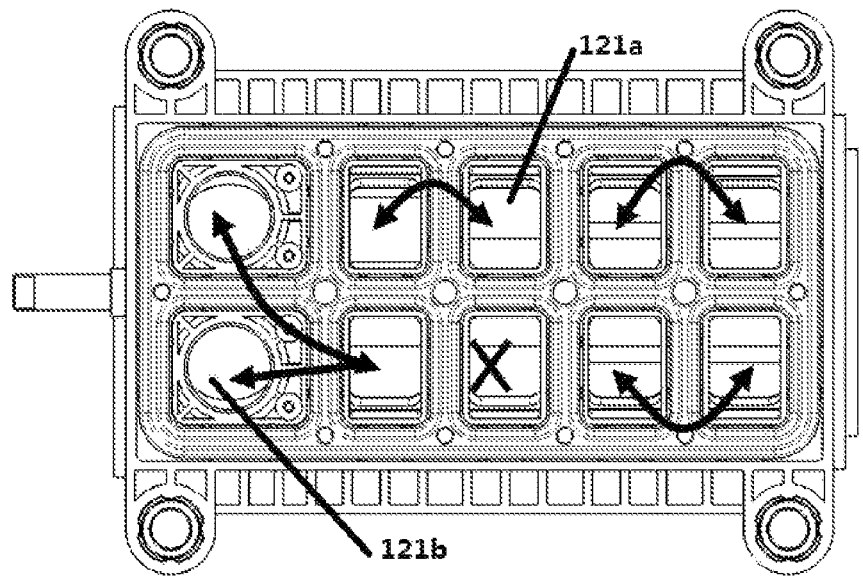
FIG. 32 is a schematic view of a control valve in a ninth communication mode according to an embodiment of the present application.

Referring to FIG. 32, when the control valve 1000 is in a ninth communication mode, the first predetermined angle is 1440°/7 in the first direction, the first flow channel 121a rotates to the third fan-shaped section 26 and the fourth fan-shaped section 27, and the second predetermined angle is 60° in the first direction. The third passage 31 is in communication with the second flow channel 121b located above, and the third passage 31 is in communication with the second passage 22 located in the third fan-shaped section 26. Corresponding one of the first flow channels 121a, one of the second passages 22, one of the third passages 31 and one of the second flow channels 121b form a three-way flow path. Three first passages 21 are respectively in communication with different two of the first flow channels 121a to form three two-way flow paths, and the cut-off groove 23 correspondingly seals one of the first flow channels 121a to form a closed flow path.

Figure 33:
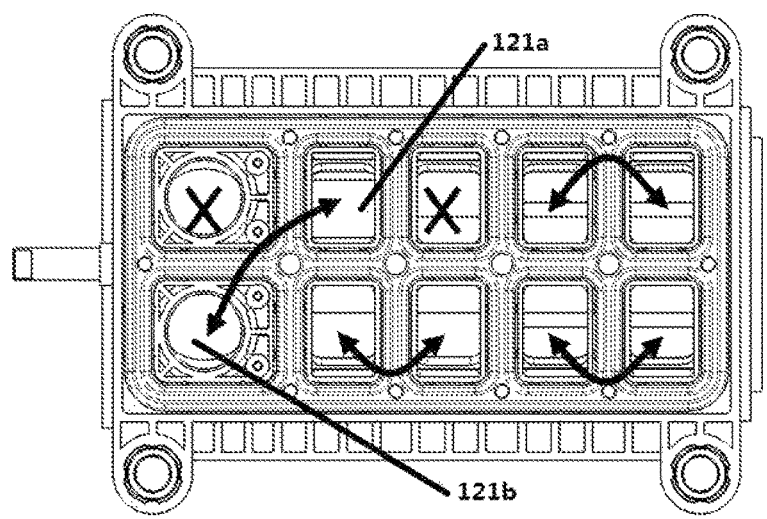
FIG. 33 is a schematic view of a control valve in a tenth communication mode according to an embodiment of the present application.

Referring to FIG. 33, when the control valve 1000 is in a tenth connected mode, the first predetermined angle is 1800°/7 in the first direction, the first flow channel 121a rotates to the fourth fan-shaped section 27 and the fifth fan-shaped section 28, and the second predetermined angle is zero. The third passage 31 is in communication with the second flow channel 121b located below, and the third passage 31 is in communication with the second passage 22 located in the fifth fan-shaped section 28. Corresponding one of the first flow channel 121a, one of the second passage 22, one of the third passage 31 and one of the second flow channel 121b form a two-way flow path. Three of the first passages 21 are respectively in communication with different two of the first flow channels 121a to form three two-way flow paths, and the cut-off groove 23 correspondingly seals one of the first flow channels 121a to form a closed flow path.

Figure 34:
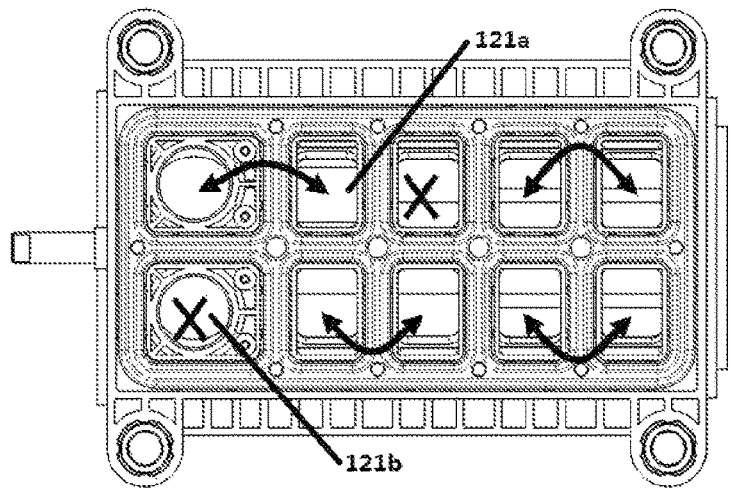
FIG. 34 is a schematic view of a control valve in an eleventh communication mode according to an embodiment of the present application.

Referring to FIG. 34, when the control valve 1000 is in an eleventh communication mode, the first predetermined angle is 1800°/7 in the first direction, the first flow channel 121a rotates to the fourth fan-shaped section 27 and the fifth fan-shaped section 28, and the second predetermined angle is 120° in the first direction. The third passage 31 is in communication with the second flow channel 121b located above, and the third passage 31 is in communication with the second passage 22 located in the fifth fan-shaped section 28. Corresponding one of the first flow channels 121a, one of the second passages 22, one of the third passages 31 and one of the second flow channels 121b form a two-way flow path. Three of the first passages 21 are respectively in communication with different two of the first flow channels 121a to form three two-way flow paths, and the cut-off groove 23 correspondingly seals one of the first flow channels 121a to form a closed flow path.

Figure 35:
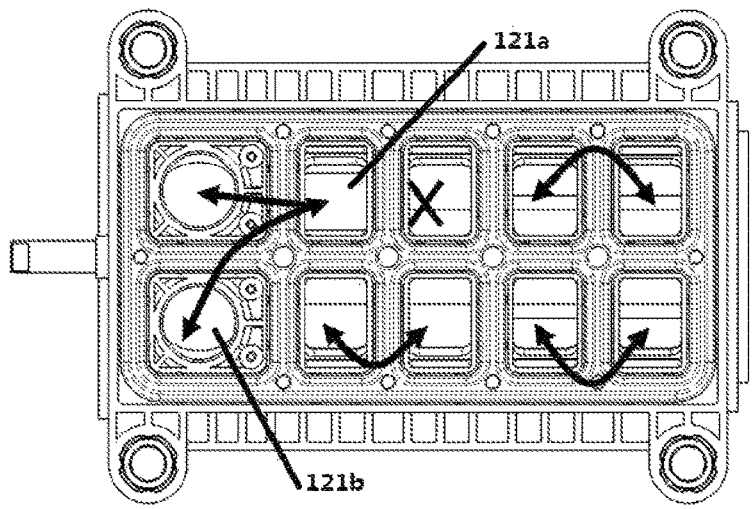
FIG. 35 is a schematic view of a control valve in a twelfth communication mode according to an embodiment of the present application.
Figure 36:
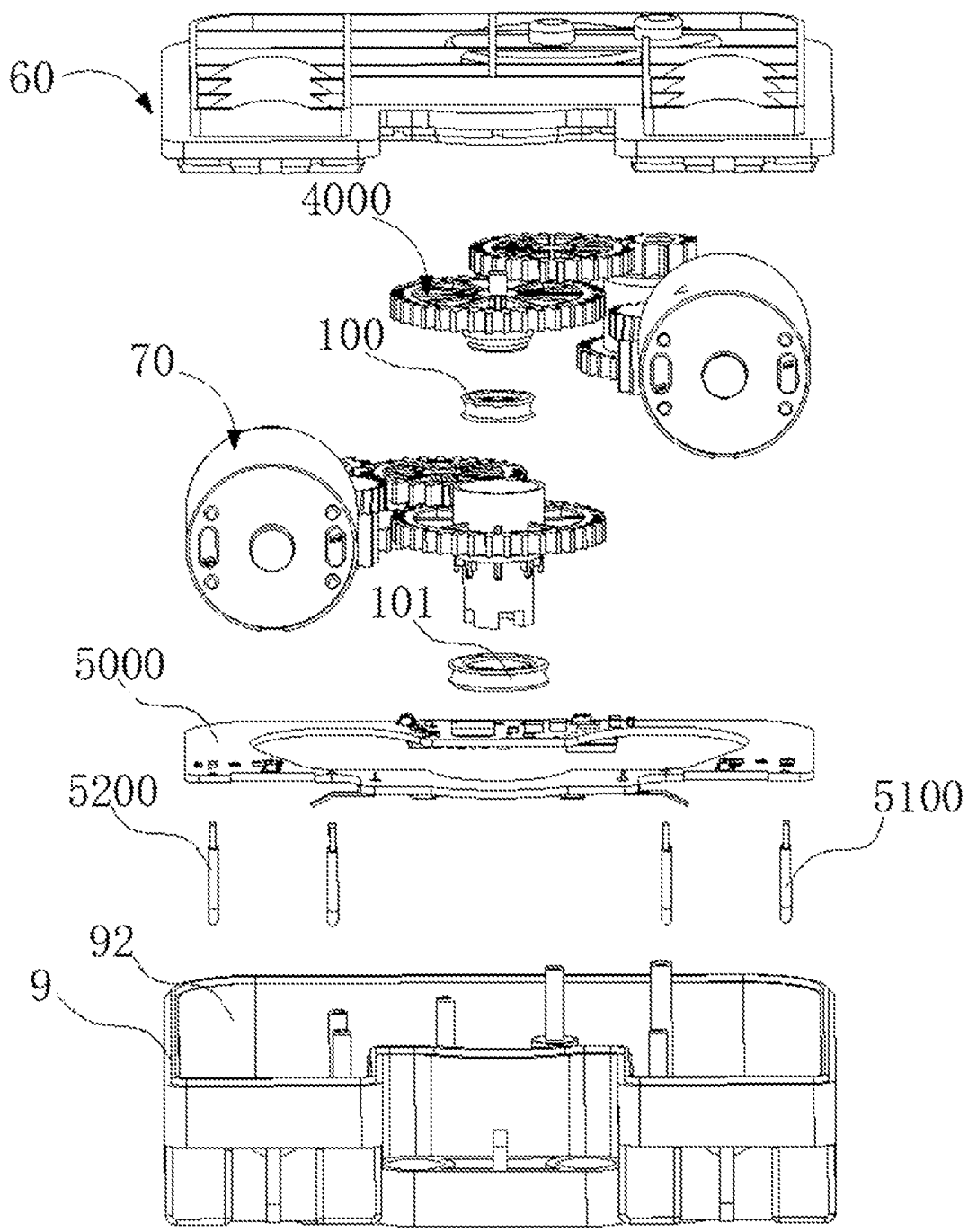
FIG. 36 is an exploded schematic view of a driver according to an embodiment of the present disclosure.

Referring to FIG. 35, when the control valve 1000 is in a twelfth communication mode, the first predetermined angle is 1800°/7 in the first direction, the first flow channel 121a rotates to the fourth fan-shaped section 27 and the fifth fan-shaped section 28, and the second predetermined angle is 60° in the first direction. The third passage 31 is in communication with two of the second flow channels 121b, and the third passage 31 is in communication with the second passage 22 located in the fifth fan-shaped section 28. Corresponding one of the first flow channels 121a, one of the second passages 22, one of the third passages 31 and two of the second flow channels 121b form a three-way flow path. Three of the first passages 21 are respectively in communication with different two of the first flow channels 121a to form three two-way flow paths, and the cut-off groove 23 correspondingly closes one of the first flow channels 121a to form a closed flow path.

Figure 8:
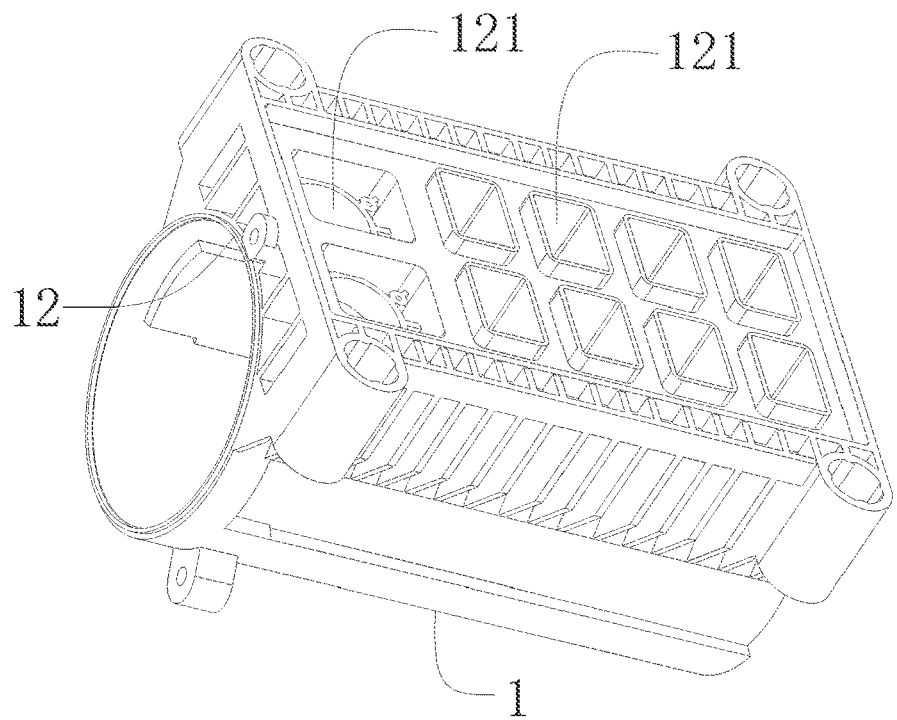
FIG. 8 is a schematic view of a valve body according to an embodiment of the present disclosure.

In an embodiment, referring to FIG. 8, the valve body 1 includes a side wall portion 12 and a mounting portion 13. The side wall portion 12 of the valve body 1 is a side wall of the valve cavity 11 or at least a part of the side wall of the valve cavity 11. The plurality of communicating holes 121 are located in the side wall portion 12 of the valve body 1. One side of the mounting portion 13 of the valve body 1 is fixedly connected to the side wall portion 12 of the valve body 1, and the other side, away from the side wall portion 12, of the mounting portion 13 of the valve body 1 is provided with a mounting plane 131. The mounting plane 131 is provided with a valve port 132 correspondingly in communication with the plurality of communicating holes 121. By providing the side wall portion 12 and the communicating holes 121 on the side wall portion 12, the communicating holes 121 on the valve body 1 can be more compact. The control valve 1000 needs to be installed on other parts when in use and the mounting part 13 connected with the side wall part 12 are arranged outside the valve body 1. Then the control valve 1000 can be installed on other parts by the mounting portion 13, and the mounting plane 131 is arranged on the other side of the mounting portion 13 away from the side wall portion 12. By providing the mounting plane 131, it greatly reduces installation difficulty of the control valve 1000 and other parts, and improves the installation efficiency of the control valve 1000. Specifically, the mounting plane 131 is provided with a plurality of threaded holes, and the control valve 1000 is detachably connected to other parts by fasteners.

Figure 12:
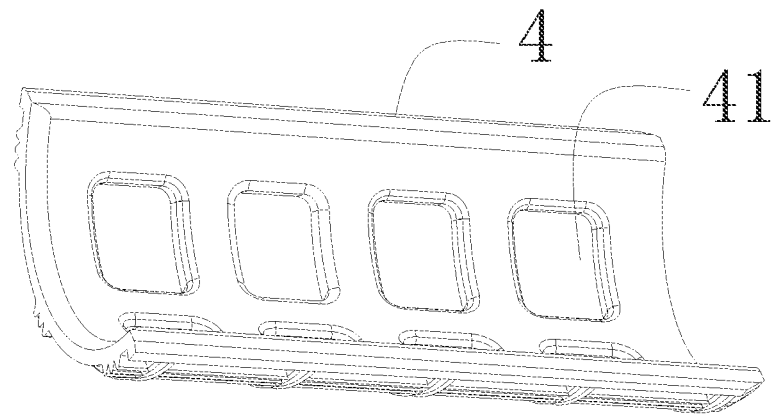
FIG. 12 is a schematic view of a sealing gasket according to an embodiment of the present disclosure.
Figure 13:
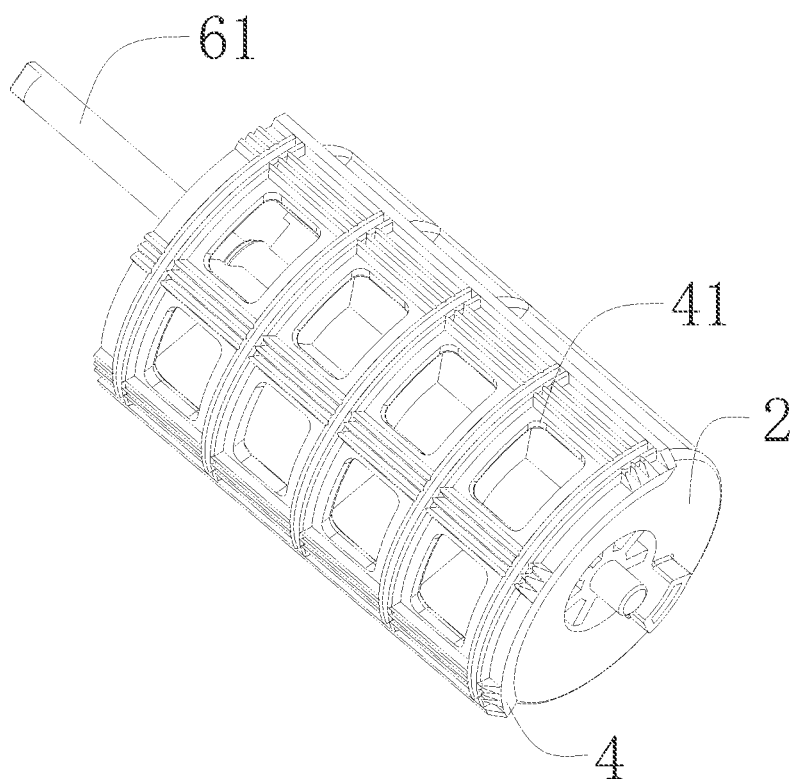
FIG. 13 is a schematic view of a first valve core connected with a sealing gasket according to an embodiment of the present disclosure.

Furthermore, referring to FIGS. 12 and 13, the control valve 1000 further includes a sealing gasket 4. The sealing gasket 4 is disposed between the first valve core 2 and the side wall portion 12 of the valve body 1, the sealing gasket 4 is provided with a notch 41 correspondingly in communication with the plurality of first flow channels 121a. One surface of the sealing gasket 4 in a thickness direction of the sealing gasket 4 is in contact with and sealing fit with a surface of the first valve core 2, and the other surface of the sealing gasket 4 in the thickness direction of the sealing gasket 4 is sealingly connected to an inner surface of the side wall portion 12 of the valve body 1. In this way, the fluid entering the valve cavity 11 from the first flow channel 121a must first pass through the notch 41 on the sealing gasket 4. Since one surface of the sealing gasket 4 in the thickness direction is in contact with and sealed with the surface of the first valve core 2, and the other surface of the sealing gasket 4 in the thickness direction is hermetically connected to the inner surface of the side wall portion 12, it is difficult for fluid to leak at a joint of the first valve core 2 and the valve body 1, which is beneficial to the use of the control valve 1000. Specifically, the sealing gasket 4 is in a sheet shape, and the surface of the sealing gasket 4 adjacent to the first valve core 2 is smooth, which is beneficial to the rotation of the first valve core 2 relative to the sealing gasket 4. The sealing gasket 4 is usually made of rubber or silica gel, and the whole sealing gasket 4 is integrally formed.

Furthermore, referring to FIGS. 16 to 19, the control valve 1000 further includes a sealing cylinder 5. The sealing cylinder 5 is disposed between the second valve core 3 and the side wall portion 12 of the valve body 1. The sealing cylinder 5 is correspondingly in communication with the plurality of second flow channels 121b and the third passage 31. One end of the sealing cylinder 5 is in contact with and sealingly matched with an outer surface of the second valve core 3, and the other end of the sealing cylinder 5 is sealingly connected to an inner surface of the side wall portion 12. In this way, it is difficult for the fluid to leak at a joint of the second valve core 3 and the valve body 1, which is beneficial to the use of the control valve 1000. Specifically, the sealing cylinder 5 is cylindrical, and the end surface of the sealing cylinder 5 adjacent to the second valve core 3 is a smooth curved surface, which is beneficial for the sealing cylinder 5 to abut against and be in contact with the surface of the second valve core 3. More specifically, the sealing cylinder 5 includes a sealing block 51 and the metal elastic piece 53 connected to one end of the sealing block 51. One end of the sealing block 51 away from the metal elastic piece 53 is in contact with the outer surface of the second valve core 3, and one end of the metal elastic piece 53 away from the sealing block 51 abuts against the valve body 1. In this way, the metal elastic piece 53 can provide enough buffer space for the sealing cylinder 5, so as to avoid a plastic deformation of the sealing cylinder 5 after being impacted, which will affect the sealing performance of the control valve 1000. In addition, a rubber ring 52 is sleeved on the outer side of the sealing block 51, and an outer side of the rubber ring 52 which away from the sealing block 51 is in tightly contact with the inner wall of the second flow channel 121b.

Figure 15:
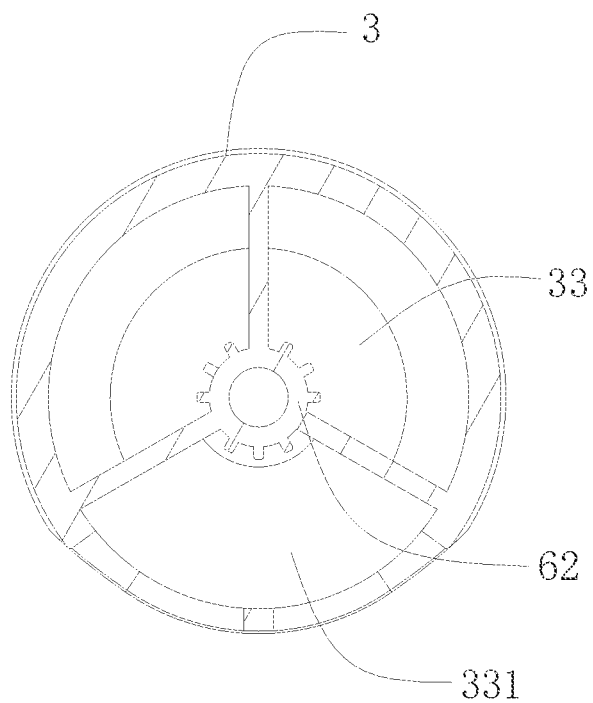
FIG. 15 is a sectional view of a second valve core according to an embodiment of the present disclosure.
Figure 16:
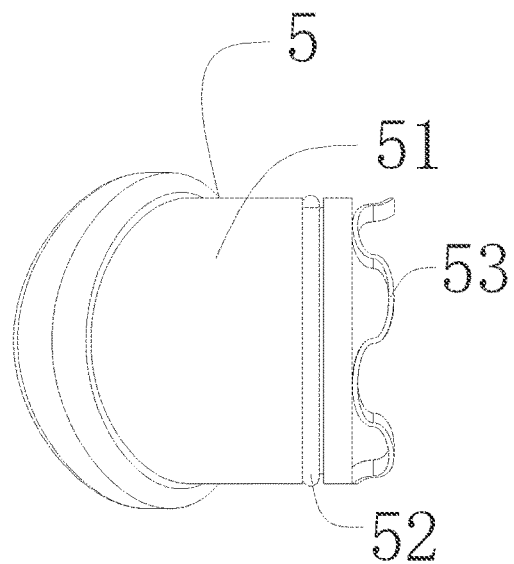
FIG. 16 is a first schematic view of a sealing cylinder according to an embodiment of the present disclosure.
Figure 17:
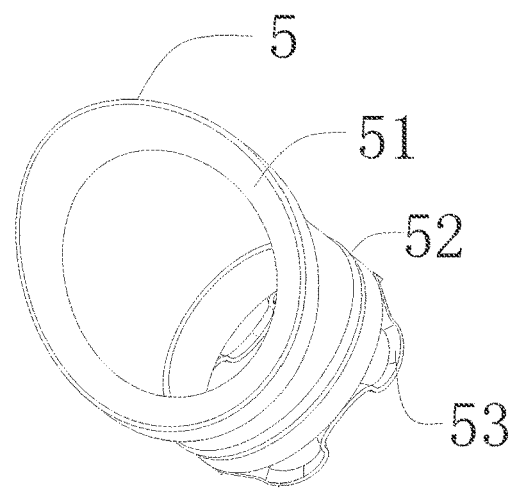
FIG. 17 is a second schematic view of a sealing cylinder according to an embodiment of the present disclosure.
Figure 18:
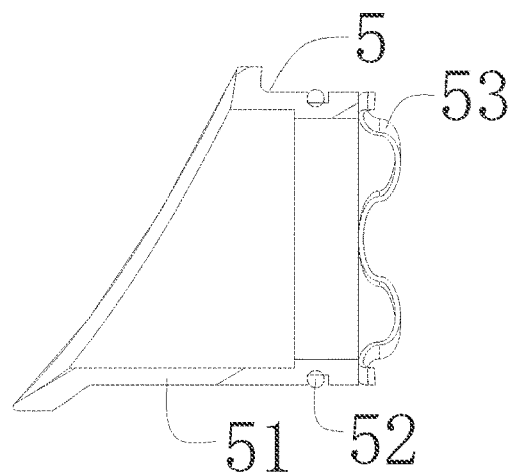
FIG. 18 is a sectional view of a sealing cylinder according to an embodiment of the present disclosure.
Figure 19:
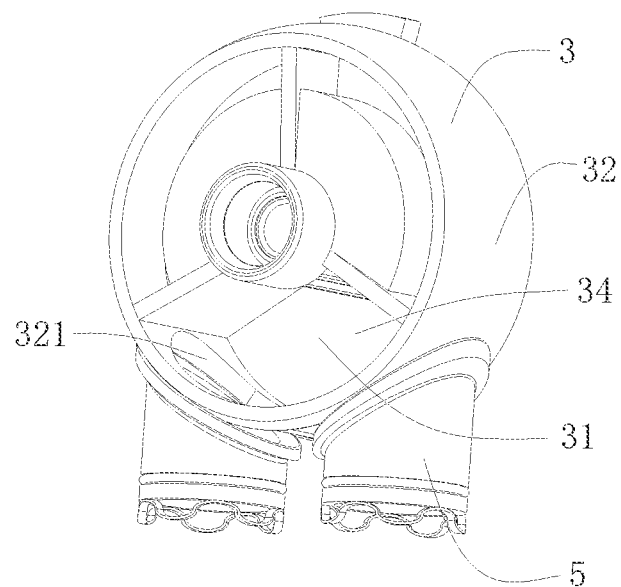
FIG. 19 is a schematic view of a second valve core equipped with a sealing cylinder according to an embodiment of the present application.

In an embodiment, referring to FIGS. 14 and 15, the second valve core 3 includes a side plate 32 and an end plate 33. The side plate 32 is in a circle shape, the end plate 33 is disposed at one end of the side plate 32 adjacent to the first valve core 2, and an accommodating cavity 34 is formed by the side plate 32 and the end plate 33 being surrounded. The side plate 32 is provided with an open hole 321 through which the second valve core 3 is in communication with the plurality of second flow channels 121b. The end plate 33 is provided with an opening 331 through which the second valve core 3 is in communication with the plurality of second passages 22. The third passage 31 is formed by the open hole 321, the accommodating cavity 34 and the opening 331. When the side plate 32 rotates to the open hole 321 to connect the second flow channel 121b of the valve body 1, the third passage 31 can be in communication with the second flow channel 121b. And, the open hole 321 is aligned with two of the second flow channels 121b, so the third passage 31 can be in communication with two of the second flow channels 121b at the same time. The open hole 321 is aimed at one of the second flow channels 121b, so the third passage 31 can be only in communication with a single one of the second flow channels 121b. When the side plate 32 is rotated to a part other than the open hole 321 which is in communication with to the second flow channel 121b of the valve body 1, the third passage 31 cannot be in communication with the second flow channel 121b. This arrangement simplifies the structure of the second valve core 3 and reduces the manufacturing difficulty of the control valve 1000. Similarly, referring to FIG. 9 the second passage 22 also has two communication ports, namely, the first connecting port 22a and the second connecting port 22b. The first connecting port 22a is arranged towards the valve body 1. In this way, the first connecting port 22a can be configured to be in communication with the first flow channel 121a. The second connecting port 22b is arranged at the end of the first valve core 2 facing the second valve core 3. In this way, the second connecting port 22b can be configured to be in communication with the opening 331.

In an embodiment, referring to FIGS. 1 to 3 and 21 to 23, the control valve 1000 further includes a first transmission shaft 61, a second transmission shaft 62, a first actuator assembly 7 and a second actuator assembly 8. The second transmission shaft 61 is fixedly connected to the second valve core 2. The second transmission shaft 62 is fixedly connected to the second valve core 3, the second transmission shaft 62 is sleeved outside of the first transmission shaft 61, and the second transmission shaft 62 is coaxially disposed with the first transmission shaft 61. The first actuator assembly 7 is coupled to the first transmission shaft 61 to drive the first transmission shaft 61 to rotate. The second actuator assembly 8 is coupled to the second transmission shaft 62 to drive the second transmission shaft 62 to rotate. In this way, the rotation of the first valve core 2 is independently controlled by the first actuator assembly 7, and the rotation of the second valve core 3 is independently controlled by the second actuator assembly 8, it is beneficial to the separate adjustment of the first valve core 2 and the second valve core 3, and improves the flexibility of the control valve 1000. In this embodiment, the first actuator assembly 7 and the second actuator assembly 8 are both located on the side of the second valve core 3 away from the first valve core 2. In order to improve the compactness of structure of the control valve 1000, the second transmission shaft 62 is sleeved outside the first transmission shaft 61. It is not limited that, when both the first actuator assembly 7 and the second actuator assembly 8 are located on the side of the first valve core 2 away from the second valve core 3, alternatively, the first transmission shaft 61 can be sleeved outside the second transmission shaft 62. When the first actuator assembly 7 is arranged on the side of the first valve core 2 away from the second valve core 3 and the second actuator assembly 8 is located at the side of the second valve core 3 away from the first valve core 2, the first transmission shaft 61 and the second transmission shaft 62 are not nested with each other. In this embodiment, the first transmission shaft 61 penetrates the whole first valve core 2, which is beneficial to connection between the first transmission shaft 61 and the first valve core 2 more tightly.

In an embodiment, referring to FIG. 14, the accommodating cavity 34 is internally provided with a rotationally symmetrical support plate. One end of the support plate is connected with the second transmission shaft 62, and the other end of the support plate is connected with an inner wall of the side plate 32. In this way, a structural strength of the second valve core 3 is improved, and a service life of the control valve 1000 is prolonged.

Figure 21:
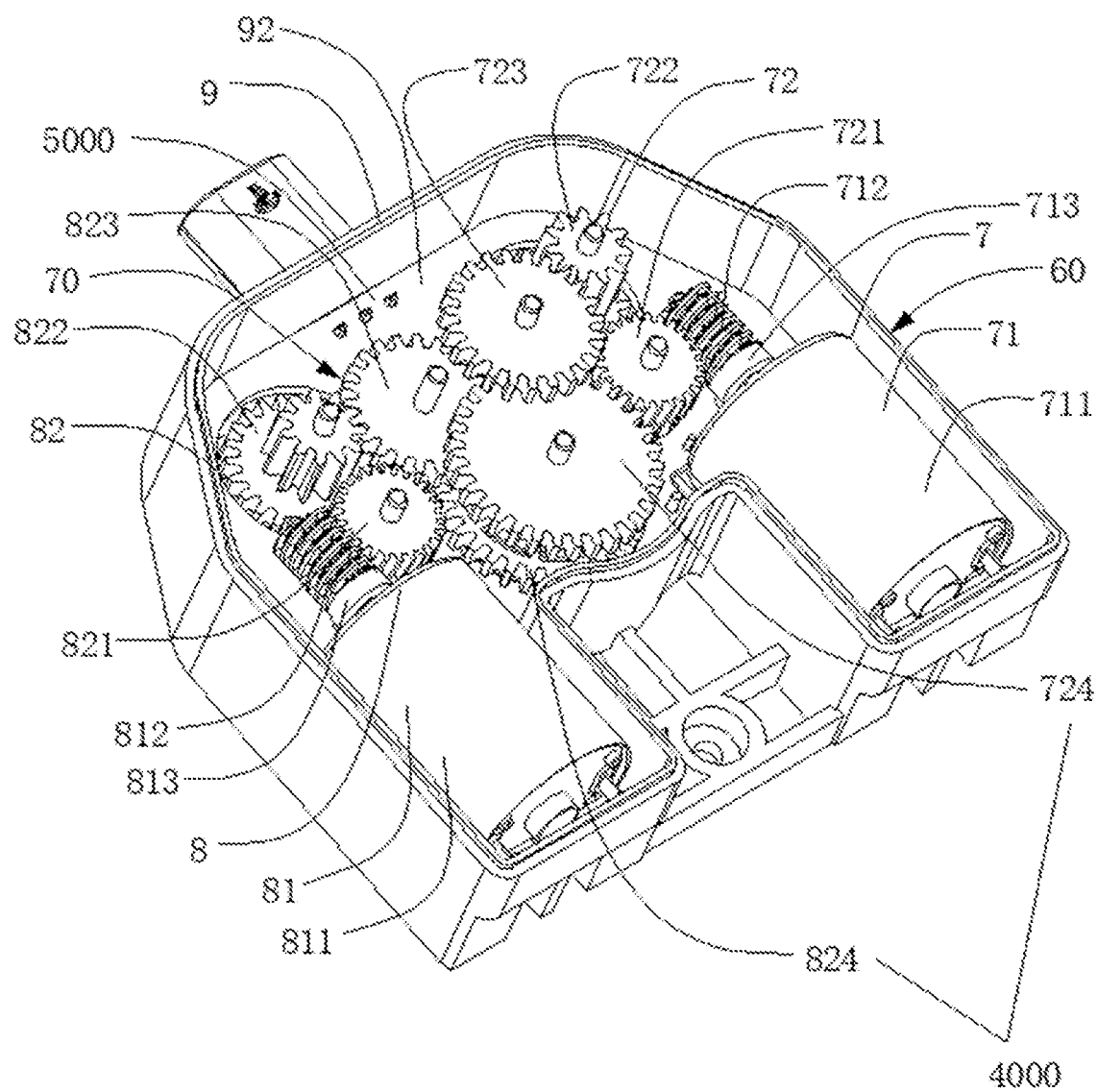
FIG. 21 is a partial structural schematic of a control valve according to an embodiment of the present disclosure.

In an embodiment, referring to FIG. 21, the first actuator assembly 7 includes a first motor component 71 and a first reducer component 72. The first reducer component 72 is connected to the first motor component 71 and the first transmission shaft 61. The first motor component 71 is capable of reducing an output rotational speed and driving the first transmission shaft 61 to rotate by the first reducer component 72. The second actuator assembly 8 includes a second motor component 81 and a second reducer component 82. The second reducer component 82 is connected to the second motor component to the second transmission shaft 62. The second motor component 81 is capable of reducing an output rotational speed and driving the second transmission shaft 62 to rotate by the second reducer component 82. By providing the first motor component 71, it can greatly improve the control accuracy of the first valve core 2. Similarly, by providing the second motor component 81, it can greatly improve the control accuracy of the second valve core 3. By providing the first reducer component 72, it is beneficial to decrease of the rotation speed of the first motor component 71 in a reasonable range, so as to avoid control accuracy of the first valve core 2 being affected by too fast rotation speed of the first valve core 2. Similarly, by providing the second magnetic ring 82, it is conducive to reducing the rotational speed of the second motor component 81 to be in a reasonable range and avoiding control accuracy of the second valve core 3 from being affected by too fast rotation speed of the second valve core 3.

Figure 22:
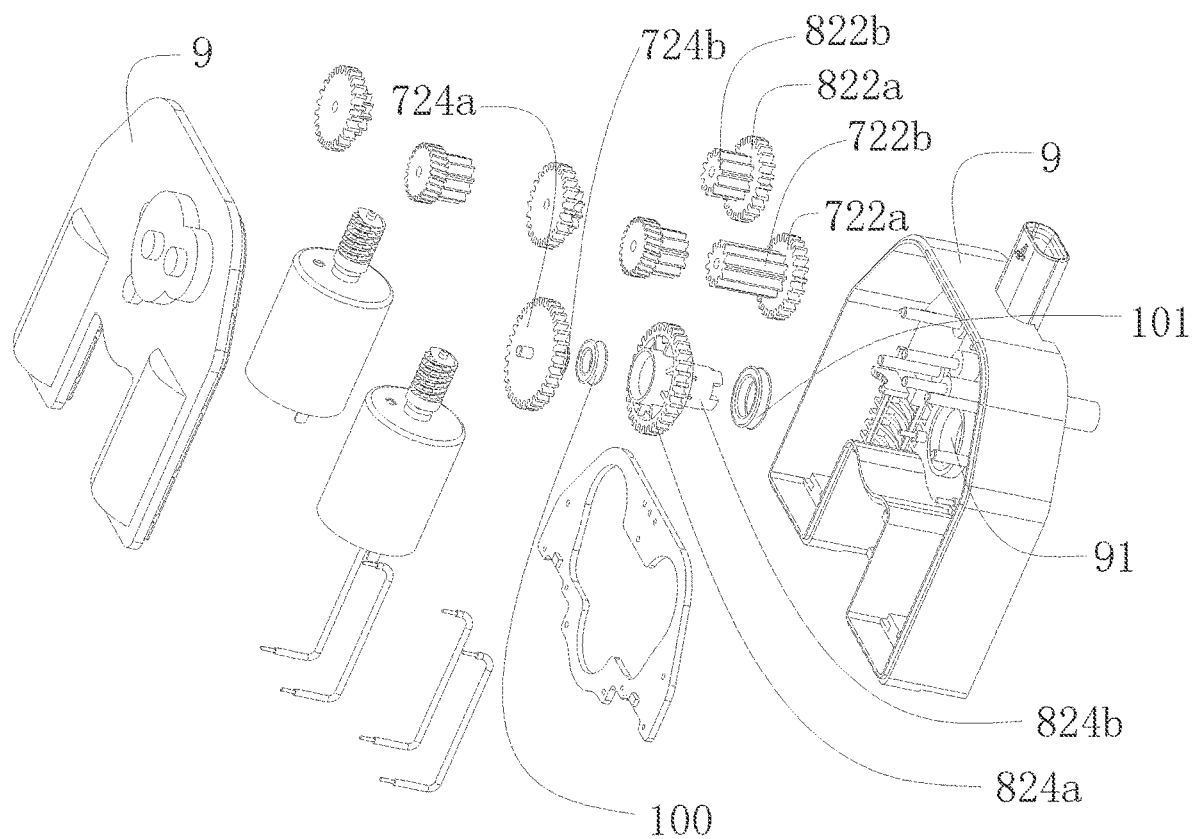
FIG. 22 is an exploded schematic view of the control valve in FIG. 20.

Furthermore, referring to FIG. 21 and FIG. 22, the first motor component 71 includes a first motor 711 and a first worm 712. The first worm 712 is connected to an output shaft of the first motor 711. The first reducer component 72 includes a first worm gear 721, a first secondary gear 722, a first connecting gear 723 and a first output gear 724 connected in sequential meshes. The first worm gear 721 is connected in mesh to the first worm 712. The first output gear 724 is clamped to an end of the first transmission shaft 61 extending out of the second transmission shaft 62. By providing the first worm 712 and the first worm gear 721, it facilitates the connection between the first motor 711 and the first secondary gear 722, and enables the first worm 712 and the first worm gear 721 to have a larger transmission ratio. In other words, an angular velocity of the first worm gear 721 is much smaller than that of the first worm 712, which is beneficial to decrease of the rotational speed of the first motor 711. By providing the first secondary gear 722, an output speed of the first motor 711 can be further reduced, which is beneficial to precise control of the rotation angle of the first valve core 2 by the control valve 1000.

The second motor component 81 includes a second motor 811 and a second worm 812. The second worm 812 is connected to an output shaft of the second motor 811. The second reduction gear component 82 includes a second worm gear 821, a second secondary gear 822, a second connecting gear 823 and a second output gear 824 connected in sequential mesh. The second worm gear 821 is connected in mesh to the second worm 812. The second output gear 824 is sleeved on a part of the first transmission shaft 61 extending out of the second transmission shaft 62. The second output gear 824 is clamped to an end of the second transmission shaft 62 away from the first valve core 2. By providing the second worm 812 and the second worm gear 821, it is beneficial to connection between the second motor 811 and the second secondary gear 822. The second worm 812 and the second worm gear 821 can have greater transmission, in other words, an angular velocity of the second worm gear 821 is much smaller than that of the second worm 812, which is beneficial to decrease of the rotational speed of the second motor 811. By providing the second secondary gear 822, the output speed of the second motor 811 can be further reduced, which is beneficial to the precise control of the rotation angle of the second valve core 3 by the control valve 1000.

Furthermore, in an embodiment, referring to FIG. 22, the first secondary gear 722 includes a first large-diameter gear 722a and a first small-diameter gear 722b, the first large-diameter gear 722a and the first small-diameter gear 722b are coaxially provided and fixedly connected, a diameter of the first large-diameter gear 722a is greater than that of the first small-diameter gear 722b. The first large-diameter gear 722a is connected in mesh with the first worm gear 721. The first small-diameter gear 722b is connected in mesh with the first connecting gear 723. In this way, the structure of the first secondary gear 722 is simpler, which is conducive to decrease of the assembly difficulty of the first actuator assembly 7, thus improving the assembly efficiency of the entire control valve 1000.

In an embodiment, referring to FIG. 22, the second secondary gear 822 includes a second large-diameter gear 822a and a second small-diameter gear 822b. The second large-diameter gear 822a and the second small-diameter gear 822b are coaxially provided and fixedly connected. A diameter of the second large-diameter gear 822a is greater than that of the second small-diameter gear 822b. The second large-diameter gear 822a is connected in mesh with the second worm gear 821. The second small-diameter gear 822b is connected in mesh with the second connecting gear 823. In this way, the structure of the second secondary gear 822 is simpler, which is conducive to decrease of the assembly difficulty of the second actuator assembly 8, thus improving the assembly efficiency of the entire control valve 1000.

Figure 23:
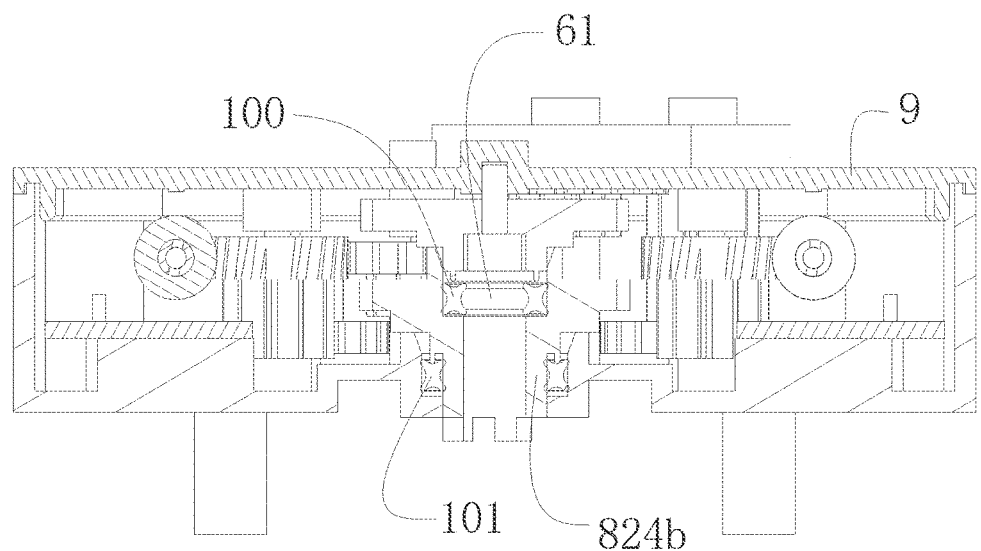
FIG. 23 is a partial sectional view of a control valve according to an embodiment of the present disclosure.

In an embodiment, referring to FIGS. 21 to 23, the control valve 1000 further includes a housing 9. Both the first actuator assembly 7 and the second actuator assembly 8 are disposed in the housing 9. The housing 9 is provided with a transmission hole 91. The compactness of the control valve 1000 can be further improved by providing the housing 9 and disposing both the first actuator assembly 7 and the second actuator assembly 8 in the housing 9.

The first output gear 724 includes a first gear portion 724a and a first connection portion 724b. The first gear portion 724a is connected in mesh with the first connection gear 724b. One end of the first connection portion 724b is fixedly connected to the first gear portion 724a and the other end of the first connection portion 724b is connected to the first transmission shaft 61 through the transmission hole 91. "The other end of the first connection portion 724b being connected to the first transmission shaft 61 through the transmission hole 91" means that an end of the first connecting portion 724b away from the first gear portion 724a passes through the transmission hole 91, extends out of the housing 9 and is connected with the first transmission shaft 61, or, an end of the first transmission shaft 61 extends into the transmission hole 91 and is connected with an end of the first connecting portion 724b away from the first gear portion 724a. Generally, the first connecting portion 724b is clamped to the first transmission shaft 61 by the way of a clamping key and a clamping groove being matched, that is, the first connecting portion 724b is provided with a limit key, and the first transmission shaft 61 is correspondingly provided with a limit groove matched with the limit key, and the limit key is clamped to the limit groove; or, the first connecting portion 724b is provided with a limit groove, and the first transmission shaft 61 is correspondingly provided with a limit key matched with the limit slot, and the limit key is clamped with the limit groove.

The second output gear 824 includes a second gear portion 824a and a second connection portion 824b. The second gear portion 824a is connected in mesh with the second connection gear 824b. One end of the second connection portion 824b is fixedly connected to the second gear portion 824a and the other end of the second connection portion 824b is connected to the second transmission shaft 61 through the transmission hole 91. "The other end of the second connection portion 824b being connected to the second transmission shaft 62 through the transmission hole 91" means that an end of the second connecting portion 824b away from the second gear portion 824a passes through the transmission hole 91, extends out of the housing 9 and is connected with the second transmission shaft 62, or, an end of the second transmission shaft 61 extends into the transmission hole 91 and is connected with an end of the second connecting portion 824b away from the second gear portion 824a. Generally, the second connecting portion 824b is clamped to the second transmission shaft 62 by the way of the clamping key and the clamping groove being matched, that is, the second connecting portion 824b is provided with a limit key, and the second transmission shaft 62 is correspondingly provided with a limit groove matched with the limit key, and the limit key is clamped to the limit groove; or, the second connecting portion 824b is provided with a limit groove, the second transmission shaft 62 is correspondingly provided with a limit key matched with the limit groove, and the limit key is clamped with the limit groove.

Furthermore, referring to FIGS. 22 and 23, a first sealing ring 100 is provided between the first transmission shaft 61 and the transmission hole 91. The first sealing ring 100 is sleeved on the first transmission shaft 61. In this way, the sealing performance of the connection between the first transmission shaft 61 and the housing 9 is improved, thereby improving sealing performance of the whole control valve 1000.

In an embodiment, referring to FIG. 22 and FIG. 23, a second sealing ring 100 is provided between the second connection portion 824b and the transmission hole 91. The second sealing ring 100 is sleeved on the second connection portion 824b. In this way, sealing performance of the connection between the second output gear 824 and the housing 9 is improved, thereby improving sealing performance of the whole control valve 1000.

Referring to FIGS. 2, 3, 21, 22 and 23, the present disclosure provides a driver 60. The driver 60 is applied in the control valve 1000 to drive the valve core assembly 6000 in the control valve 1000 to rotate. The control valve 1000 is installed on new energy vehicles, for example, the control valve 1000 is applied to pure electric vehicles or hybrid electric vehicles as a part of the thermal management system to realize the function of medium commutation or flow regulation. In this embodiment, the control valve 1000 is installed on a manifold, and is mainly used to realize reversing function of a medium, which is liquid such as water. Of course, in other embodiments, the control valve 1000 can also be used for circulation of other media such as gas.

The existing drivers of control valves usually have some problems, such as low driving efficiency, low compatibility and complex structure.

Referring to FIGS. 2, 3, and 21 to 23, the present disclosure provides a driver 60. The driver 60 is applied in the control valve 1000. The control valve 1000 includes at least two valve core assemblies 6000 disposed coaxially. The driver 60 includes a housing 9, an actuator mechanism 70, and at least two output wheels 4000. The housing 9 includes a cavity 92. The actuator mechanism 70 and the at least two output wheels 4000 are disposed in the cavity 92. The actuator mechanism 70 is coupled to the at least two output wheels 4000 and configured for driving the at least two output wheels 4000 to rotate. The at least two output wheels 4000 are respectively connected to and coaxially provided in correspondence with the at least two valve core assemblies 6000, the at least two output wheels 4000 are capable of operating independently and driving the at least two valve core assemblies 6000 to rotate respectively.

It should be noted that in this embodiment, at least two of the output wheel 4000 are respectively connected to at least two of the valve core assembly 6000 and coaxially arranged. And at least two of the output wheels 4000 can operate independently of each other to drive the valve core assembly 6000 to rotate, so that at least two of the output wheels 4000 on the same axis can drive at least two of the valve core assemblies 6000 to move independently. At least two of the valve core assemblies 6000 have no influence on each other, thus improving the driving efficiency of the driver 60.

In this embodiment, the driver 60 includes at least two coaxially arranged output wheels 4000. At least two of the output wheel 4000 can operate independently of each other to drive the valve core assembly 6000 to rotate. And at least two of the valve core assemblies 6000 can rotate at different angles to enable the control valve 1000 to form various communication modes. Specifically, assuming that the control valve 1000 includes two the valve core assembly 6000, then assuming that the first valve core can have a communication modes by rotating at different angles, and the second valve core can have b communication modes by rotating at different angles, the whole control valve 1000 can realize a*b communication modes. At least two of the output wheels 4000 are coaxially arranged. The rotation between the coaxial output wheels 4000 does not interfere with each other. In this way, the arrangement of the actuator mechanism 70 and the output wheel 4000 in the driver 60 the housing 9 can be made more compact, and the compatibility of the control valve 1000 can be improved on the premise of compact structure, so that more circulation channels can be realized at the same time.

Referring to FIGS. 21 to 23, the actuator mechanism 70 at least includes a second motor component 81, a second reducer component 82, a first motor component 71 and a first reducer component 72. The second reducer component 82 is connected to the second motor component 81. The at least two output wheels 4000 includes a second output gear 824. The second reducer component 82 is connected to the second output gear 824. The second motor component 81 is capable of reducing an output rotational speed and driving the second output gear 824 to rotate through the second reducer component 82. The first reducer component 72 is connected to the first motor component 71. The at least two output wheels 4000 further includes a first output gear 724. The first output gear 724 is connected to the first reducer component 72. The first motor component 71 is capable of reducing an output rotational speed and driving the first output gear 724 to rotate through the first reducer component 72.

It should be noted that the control accuracy of the valve core assembly 6000 corresponding to the second motor component 81 and the first motor component 71 is greatly improved by the second motor component 81 and the first motor component 71. By providing the second reducer component 82 and the first reducer component 72, it is beneficial to decrease of the rotation speed of the second motor component 81 and the first motor component 71 in a reasonable range. It can avoid the control of the corresponding valve core assembly 6000 due to too fast rotation speed of the corresponding output wheel 4000.

It is worth noting that, "the actuator mechanism 70 at least including the second motor component 81, the second reducer component 82, the first motor component 71 and the first reducer component 72" means that, the actuator mechanism 70 includes at least two sets of interconnected motor components and reducer components. In other embodiments, the actuator mechanism 70 may also include three sets, four sets, five sets or even more interconnected motor assemblies and reducer assemblies. For example, when the actuator mechanism 70 includes three sets of motor components and reducer components which are connected with each other, there are also three corresponding output wheels 4000, and the three output wheels 4000 are coaxial and nested with each other, so that the rotation of the three output wheels 4000 will not interfere with each other, which is not limited here.

Referring to FIGS. 21 to 23, the second motor component 81 includes a second motor 811 and a second worm 812. The second worm 812 is connected to an output shaft of the second motor 811. The second reduction gear component 82 includes a second worm gear 821, a second secondary gear 822, a second connecting gear 823 and a second output gear 824 connected in sequential mesh. The second worm gear 821 is connected in mesh to the second worm 812, the second output gear 824 is a gear, and the second connecting section 823 is connected in mesh to the second output gear 824. The first motor component 71 includes a first motor 711 and a first worm 712. The first worm 712 is connected to an output shaft of the first motor 711. The first reducer component 72 includes a first worm gear 721, a first secondary gear 722, a first connecting gear 723 and a first output gear 724 connected in sequential meshes. The first worm gear 721 is connected in mesh to the first worm 712. The first output gear 724 is a gear, and the first connecting gear 723 is connected in mesh to the first output gear 724.

It should be noted that, by providing the second worm 812 and the second worm gear 821, it is beneficial to connection between the second motor 811 and the second secondary gear 822. And the second worm 812 and the second worm gear 821 can have greater transmission, in other words, an angular velocity of the second worm gear 821 is much smaller than that of the second worm 812, which is beneficial to decrease of the rotational speed of the second motor 811. By providing the second secondary gear 822, the output speed of the second motor 811 can be further reduced, which is beneficial to the precise control of the rotation angle of the second valve core 3 by the control valve 1000. Similarly, by providing the first worm 712 and the first worm gear 721, it facilitates the connection between the first motor 711 and the first secondary gear 722, and enables the first worm 712 and the first worm gear 721 to have a larger transmission ratio. In other words, the angular velocity of the first worm gear 721 is much smaller than that of the first worm gear 712, which is beneficial to reduce the rotational speed of the first motor 711. By providing the first secondary gear 722, the output speed of the first motor 711 can be further reduced, which is beneficial to the precise control of the rotation angle of the first valve core 2 by the control valve 1000.

Furthermore, referring to FIGS. 21 to 23, the second motor component 81 further includes a second magnetic ring 813 which is sleeved on an output shaft of the second motor 811. And the second magnetic ring 813 is located away from the second reducer component 82 relative to the second worm 812. The second magnetic ring 813 and a wire passing through the second magnetic ring 813 are equivalent to increasing the inductance of the wire to some extent. The second magnetic ring 813 has a high loss coefficient, which can convert high-frequency electromagnetic energy into heat energy through eddy current, thus inhibiting passage of high-frequency signals, so the second magnetic ring 813 can absorb and consume the energy of high-frequency signals, thus playing an anti-interference role. Similarly, the first motor component 71 further includes the first magnetic ring 713. The first magnetic ring 713 is sleeved on the output shaft of the first motor 711. The first magnetic ring 713 is arranged away from the first reducer component 72 relative to the first worm 712. The first magnetic ring 713 and a wire passing through the first magnetic ring 713 are equivalent to increasing the inductance of the wire to some extent. The first magnetic ring 713 has a high loss coefficient, which can convert high-frequency electromagnetic energy into heat energy through eddy current, thus inhibiting the passage of high-frequency signals, so the first magnetic ring 713 can absorb and consume the energy of high-frequency signals, thus playing an anti-interference role.

Furthermore, referring to FIGS. 21 to 23, the second secondary gear 822 includes a second large-diameter gear 822a and a second small-diameter gear 822b, the second large-diameter gear 822a and the second small-diameter gear 822b are coaxially provided and fixedly connected, a diameter of the second large-diameter gear 822a is greater than that of the second small-diameter gear 822b. The second large-diameter gear 822a is connected in mesh with the second worm gear 821. The second small-diameter gear 822b is connected in mesh with the second connecting gear 823. Furthermore, the first secondary gear 722 includes a first large-diameter gear 722a and a first small-diameter gear 722b. The first large-diameter gear 722a and the first small-diameter gear 722b are coaxially provided and fixedly connected. A diameter of the first large-diameter gear 722a is greater than that of the first small-diameter gear 722b. The first large-diameter gear 722a is connected in mesh with the first worm gear 721. The first small-diameter gear 722b is connected in mesh with the first connecting gear 723.

In this way, the structure of the second secondary gear 822 is simpler, which is conducive to decrease of the assembly difficulty of the second actuator assembly 8, thus improving the assembly efficiency of the entire control valve 1000. Similarly, the structure of the first secondary gear 722 is simpler, which is conducive to decrease of the assembly difficulty of the first actuator assembly 7, thus improving the assembly efficiency of the entire control valve 1000.

Furthermore, referring to FIGS. 21, 22, 23 and 36, the driver 60 further includes the circuit board 5000, the positive wire 5100 and the negative wire 5200. The actuator mechanism 70 and the output wheel 4000 are both installed on the circuit board 5000 and connected to the circuit board 5000 through the positive wire 5100 and the negative wire 5200.

In this embodiment, because the connection between the motor assembly and the reducer assembly has the characteristic of locking and limiting, that is, when the second motor component 81 drives the second reducer component 82 to rotate and drives the second output gear 824 to rotate, the first output gear 724 does not drive the first reducer component 72 to rotate with the rotation of the second output gear 824. This situation not only because the second output gear 824 and the first output gear 724 are nested with each other, and their movements are independent and do not interfere with each other, but also because the motor assembly and reducer assembly are locked, only the forward rotation of the motor assembly, reducer assembly and the output wheel 4000 can be realized, but the reverse rotation of the output wheel 4000, reducer assembly and motor assembly can not be realized.

Figure 2:
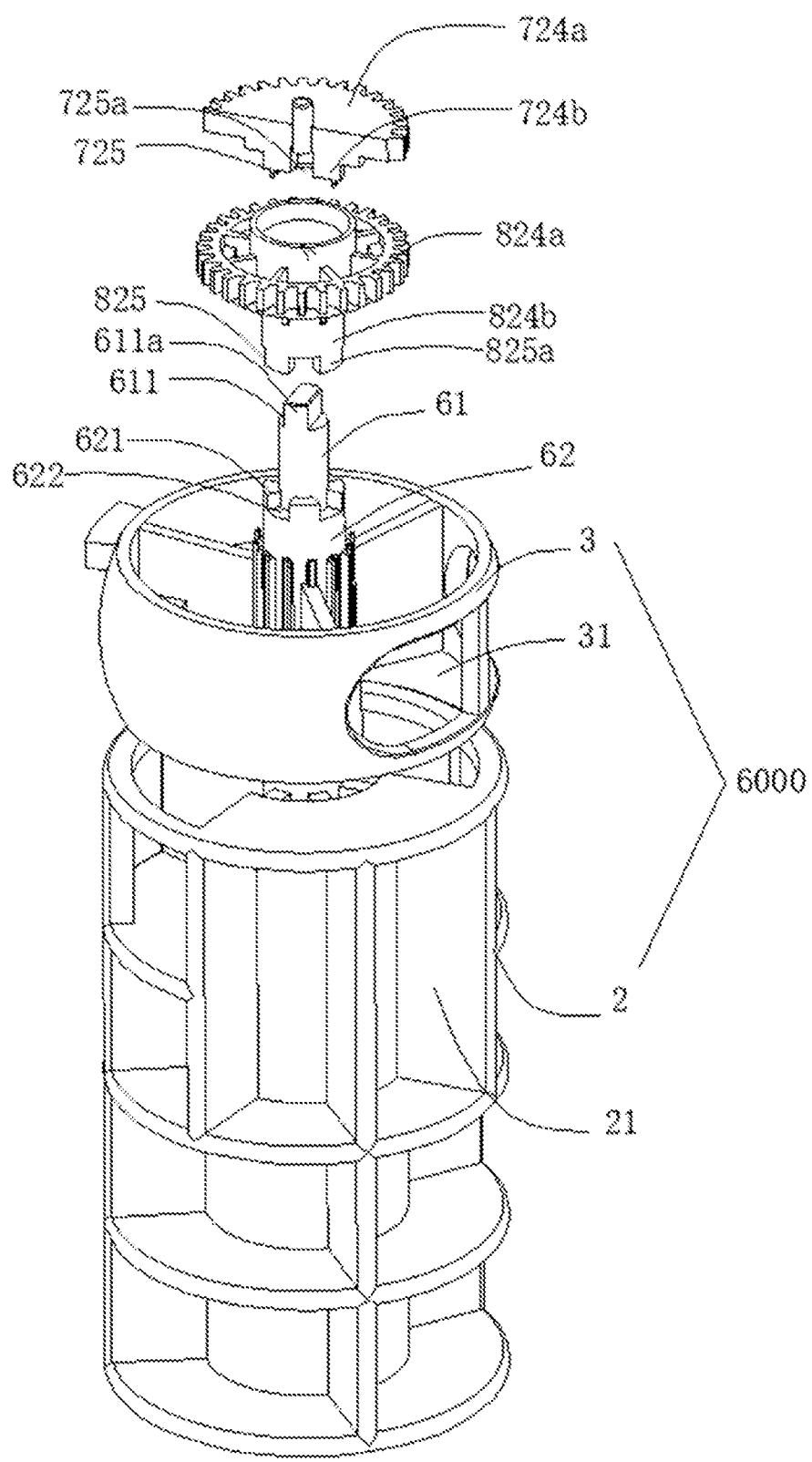
FIG. 2 is a second exploded schematic view of a control valve according to an embodiment of the present disclosure.
Figure 3:
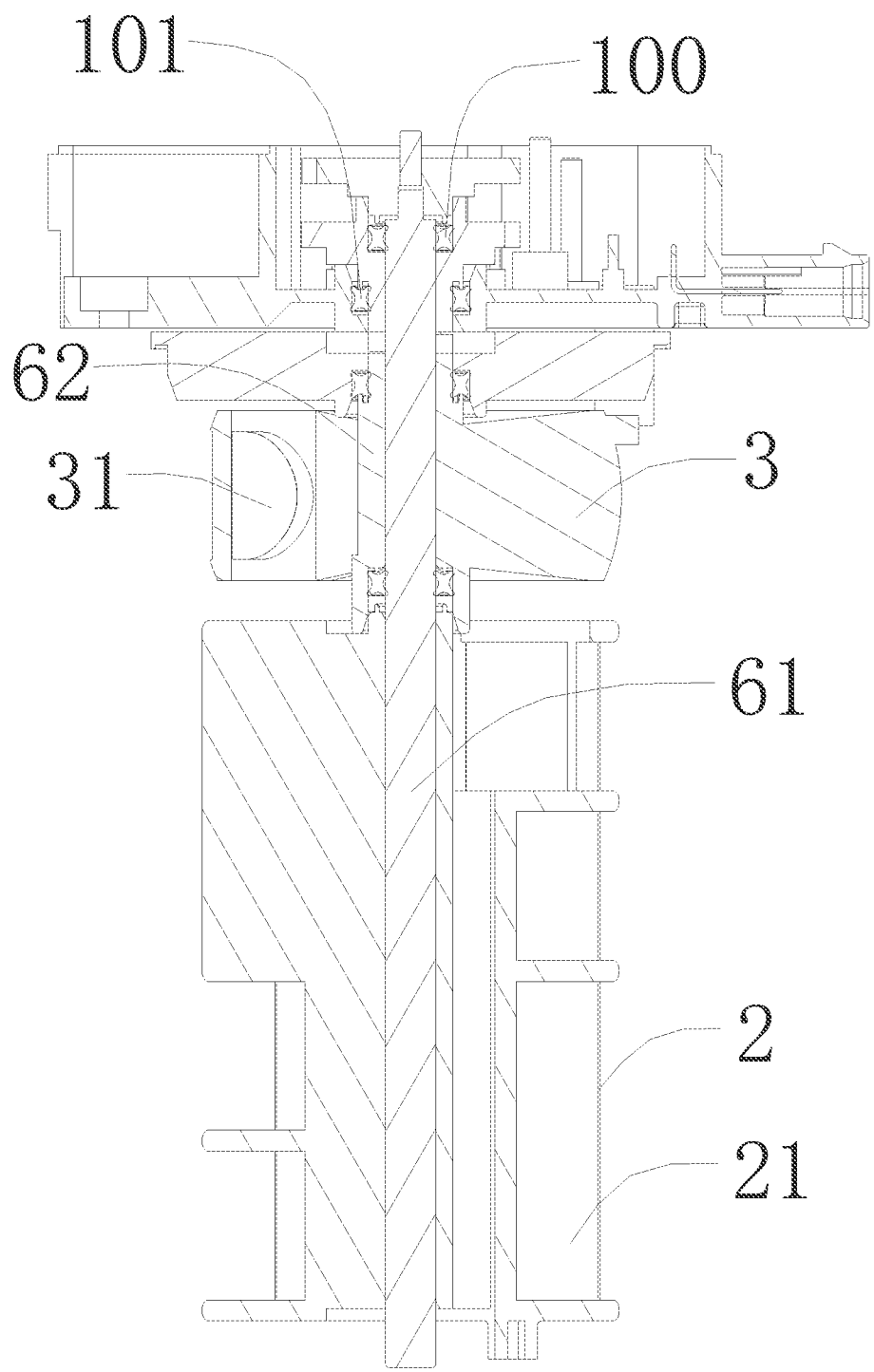
FIG. 3 is a sectional view of a control valve according to an embodiment of the present disclosure.
Figure 4:
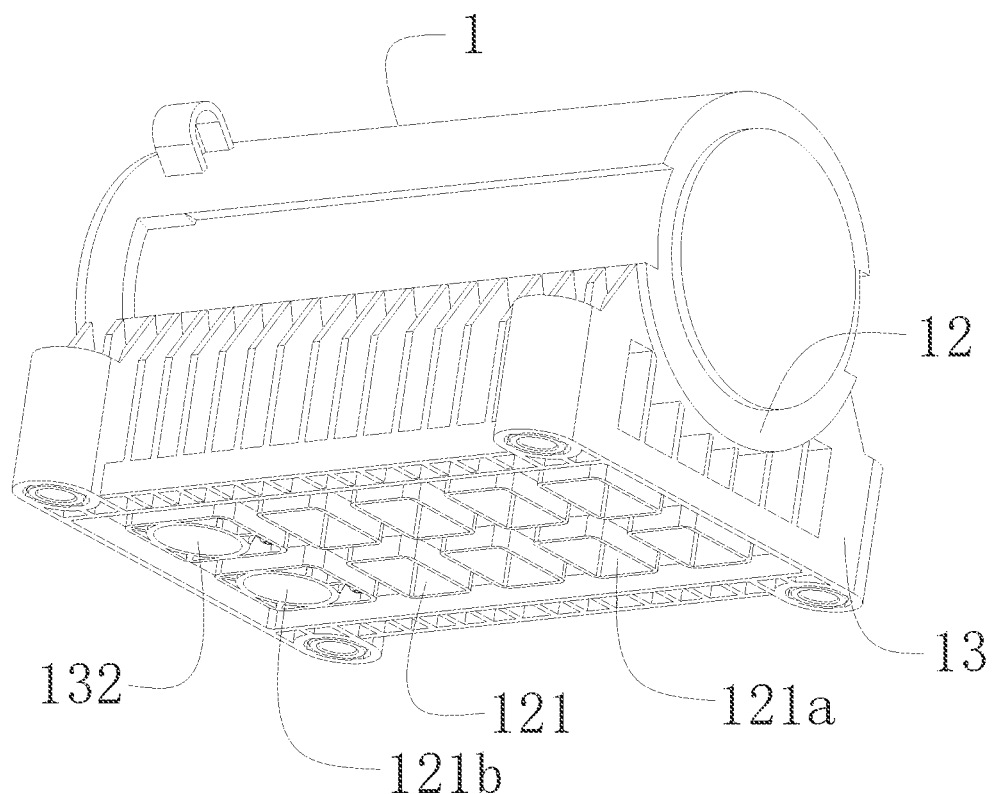
FIG. 4 is a partial structural schematic of a control valve according to an embodiment of the present disclosure.

Referring to FIGS. 2 and 3, the present disclosure provides a control valve 1000. The control valve 1000 includes a valve body 1, at least two valve core assemblies 6000 and a driver 60. The at least two valve core assemblies 6000 are coaxially arranged and arranged in the valve body 1.

Referring to FIGS. 2 and 3, the at least two of the valve core assemblies 6000 at least includes a second transmission shaft 62, a second valve core 3, a first transmission shaft 61 and a first valve core 2. The second transmission shaft 62 is fixedly connected with the second valve core 3 and the first transmission shaft 61 is fixedly connected with the first valve core 2. The second transmission shaft 62 is sleeved outside the first transmission shaft 61. The first transmission shaft 61 and the second transmission shaft 62 are coaxially arranged. The second output gear 824 is connected with the second transmission shaft 62 to drive the second transmission shaft 62 to rotate. The first output gear 724 is connected with the first transmission shaft 61 to drive the first transmission shaft 61 to rotate.

Referring to FIGS. 2 and 3, the second output gear 824 includes a second gear portion 824a and a second connection portion 824b. The second gear portion 824a is connected in mesh with the second connection gear 824b. The housing 9 is provided with a transmission hole 91. One end of the second connection portion 824b is fixedly connected to the second gear portion 824a and the other end of the second connection portion 824b is connected to the second transmission shaft 61 through the transmission hole 91. "The other end of the second connection portion 824b being connected to the second transmission shaft 62 through the transmission hole 91" means that, an end of the second connecting portion 824b away from the second gear portion 824a passes through the transmission hole 91, extends out of the housing 9 and is connected with the second transmission shaft 62, or, an end of the second transmission shaft 61 extends into the transmission hole 91 and is connected with an end of the second connecting portion 824b away from the second gear portion 824a. The first output gear 724 includes a first gear portion 724a and a first connection portion 724b. The first gear portion 724a is connected in mesh with the first connection gear 724b. One end of the first connection portion 724b is fixedly connected to the first gear portion 724a and the other end of the first connection portion 724b is connected to the first transmission shaft 61 through the transmission hole 91. "The other end of the first connection portion 724b being connected to the first transmission shaft 61 through the transmission hole 91" means that, an end of the first connecting portion 724b away from the first gear portion 724a passes through the transmission hole 91, extends out of the housing 9 and is connected with the first transmission shaft 61, or, an end of the first transmission shaft 61 extends into the transmission hole 91 and is connected with an end of the first connecting portion 724b away from the first gear portion 724a.

The second transmission shaft 62 is driven to rotate by the second output gear 824, so that the first output gear 724 drives the first transmission shaft 61 to rotate. Therefore, although the second transmission shaft 62 and the first transmission shaft 61 are coaxially arranged, they cannot affect rotation each other. Furthermore, driven by the second transmission shaft 62 and the first transmission shaft 61, the second valve core 3 and the first valve core 2 can rotate independently.

Referring to FIGS. 2 and 3, an end of the second connecting portion 824b adjacent to the second transmission shaft 62 is provided with a second fitting portion 825. An end of the second transmission shaft 62 adjacent to the second connecting portion 824b is provided with a third fitting portion 621, and the second fitting portion 825 and the third fitting portion 621 are mutually matched and fixedly connected. The first connecting portion 724b is provided with a first fitting portion 725 at an end adjacent to the first transmission shaft 61. An end of the first transmission shaft 61 adjacent to the first connecting portion 724b is provided with a first transmission shaft 611, and the first fitting portion 725 and the first transmission shaft 611 are fixedly connected with each other.

Referring to FIGS. 2 and 3, the second fitting portion 825 includes at least two second projections 825a arranged in the circumferential direction of the second connecting portion 824b. The third fitting portion 621 includes at least two third grooves 622 along the circumferential direction of the second transmission shaft 62, and the second protrusion 825a extends into the third groove 622 for concave-convex fit connection. The first fitting portion 725 includes a first groove 725a, the first transmission shaft 611 includes a fourth protrusion 611a, and the fourth protrusion 611a extends into the first groove 725a for concave-convex fit connection.

In this embodiment, referring to FIGS. 2 and 3, four second projections 825a are arranged at intervals along the circumferential direction of the end face of the second connecting portion 824b. Correspondingly, four third grooves 622 are arranged at intervals along the end face of the second transmission shaft 62. The second protrusions 825a and the third grooves 622 are matched and clamped to realize the connection between the second connecting portion 824b and the second transmission shaft 62. The connection between the first transmission shaft 61 and the first connecting portion 724b is the same, and will not be repeated here.

It should be noted that an arrangement mode and an arrangement shape among the second fitting portion 825, the third fitting portion 621, the first fitting portion 725 and the first transmission shaft 611 are not limited to the above two, and they can also be other shapes, and are not limited here.

Referring to FIGS. 2 and 3, a first sealing ring 100 is provided between the first transmission shaft 61 and the transmission hole 91, and the first sealing ring 100 is sleeved on the first transmission shaft 6. Alternatively, a second sealing ring 100 is provided between the second connection portion 824b and the transmission hole 91, and the second sealing ring 100 is sleeved on the second connection portion 824b. In this way, sealing performance of connection between the second output gear 824 and the first output gear 724 and the second transmission shaft 62 and the first transmission shaft 61 is improved, thereby improving the sealing performance of the whole control valve 1000. In other embodiments, the control valve can includes at least two valve core assemblies, transmission shafts corresponding to the at least two valve core assemblies, and output wheels corresponding to the at least two transmission shafts. An outer sleeve transmission shaft can be added outside the first transmission shaft to realize at least two coaxial transmission shafts, and at least two output wheels are correspondingly limited and matched with the at least two transmission shafts to realize torque power transmission.

Referring to FIGS. 2 and 3, the driver 60 provided by the present disclosure enables at least two of the output wheel 4000 to be respectively connected to at least two of the valve core assembly 6000 and coaxially arranged. And at least two of the output wheels 4000 can operate independently to drive the valve core assembly 6000 to rotate, so that at least two of the output wheels 4000 on the same axis can drive at least two of the valve core assemblies 6000 to move independently. At least two of the valve core assemblies 6000 have no influence on each other, thus improving the driving efficiency of the driver 60. The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

One of ordinary skill in the art should recognize that the above embodiments are used only to illustrate the present disclosure and are not used to limit the present disclosure, and that appropriate variations and improvements to the above embodiments fall within the protection scope of the present disclosure so long as they are made without departing from the substantial spirit of the present disclosure.

What is claimed is:

1. A control valve comprising a valve body provided with a valve cavity, wherein a plurality of communicating holes are provided in a side wall of the valve body, the plurality of communicating holes penetrate through the side wall of the valve body and are in communication with the valve cavity;
    a first valve core is rotatably disposed at one end of the valve cavity, the first valve core is provided with a plurality of first passages and a plurality of second passages on a circumferential side of the first valve core; and
    a second valve core is rotatably disposed at the other end of the valve cavity, and the second valve core is coaxially disposed with the first valve core, the second valve core is provided with a third passage;
    the plurality of communicating holes comprise a plurality of first flow channels and a plurality of second flow channels; on a condition that the first valve core is rotated by a first predetermined angle, each of the plurality of first passages is capable of being in communication with corresponding two of the plurality of first flow channels and each of the plurality of second passages is capable of being in communication with corresponding one of the plurality of first flow channels;
    on a condition that the second valve core is rotated by a second predetermined angle, the third passage is capable of being in communication with one or two of the plurality of second flow channels and the third passage is capable of being correspondingly in communication with the plurality of second passages, so that one of the plurality of first flow channels is correspondingly in communication with one or two of the plurality of second flow channels through the plurality of second passages and the third passage.

2. The control valve of claim 1, wherein the number of the plurality of first flow channels is 2n, wherein n is greater than or equal to 2, the number of the plurality of second flow channels is 2;
    each of the plurality of first passages is capable of being in communication with different two of the plurality of first flow channels to form less than or equal to n−1 two-way flow paths, and one of the plurality of first flow channels is capable of being in communication with one of the plurality of second flow channels through corresponding one of the plurality of second passages and the third passage to form a two-way flow path;
    or, each of the plurality of first passages is capable of being in communication with different two of the plurality of first flow channels to form less than or equal to n−1 two-way flow paths, and one of the plurality of first flow channels is capable of being in communication with two of the plurality of second flow channels through corresponding one of the plurality of second passages and the third passage to form a three-way flow path.

3. The control valve of claim 2, wherein the plurality of communicating holes are distributed in two rows in the valve body, each row of the plurality of communicating holes comprises n of the plurality of first flow channels and one of the plurality of second flow channels, and wherein two of the plurality of second flow channels corresponding to two rows are disposed at the same end of the valve body.

4. The control valve of claim 1, wherein the first valve core is a columnar structure, the first valve core is provided with a plurality of cut-off grooves, each of the plurality of the cut-off grooves is capable of closing corresponding one of the plurality of first flow channels, the plurality of first passages comprise a plurality of axial two-way slots and a plurality of circumferential two-way slots, each of the plurality of axial two-way slots is capable of being correspondingly in communication with two of the plurality of first flow channels disposed in an axial direction of the valve body, each of the plurality of circumferential two-way slots is capable of being correspondingly in communication with two of the plurality of first flow channels disposed in a circumferential direction of the valve body;

the first valve core comprises a first fan-shaped section, a second fan-shaped section, a third fan-shaped section, a fourth fan-shaped section and a fifth fan-shaped section having a fan-shaped cross-section and sequentially interconnected along a circumferential direction of the first valve core;

one end of the first fan-shaped section away from the second valve core is provided with two of the plurality of circumferential two-way slots distributed along the circumferential direction of the valve body, and the other end of the first fan-shaped section adjacent to the second valve core is provided with one of the plurality of axial two-way slots, one of the plurality of cut-off grooves, and one of the plurality of second passages, wherein the one of the plurality of axial two-way slots is located on a side of the first fan-shaped section adjacent to the second fan-shaped section, both the one of the plurality of cut-off grooves and the one of the plurality of second passages are located along the axial direction of the first valve core and on a side of the first fan-shaped section adjacent to the fifth fan-shaped section, and the one of the plurality of second passages is adjacent to the second valve core;

the second fan-shaped section is in mirror image symmetry with the first fan-shaped section;

the third fan-shaped section is provided with one of the plurality of axial two-way slots, one of the plurality of cut-off grooves and one of the plurality of second passages in a direction from away from the second valve core to towards the second valve core;

the fourth fan-shaped section is provided with two of the plurality of axial two-way slots in sequence in a direction from away from the second valve core to towards the second valve core; and the fifth fan-shaped section is provided with one of the plurality of axial two-way slots, one of the plurality of cut-off grooves and one of the plurality of second passages in a direction from away from the second valve core to towards the second valve core.

5. The control valve of claim 1, wherein the valve body comprises a side wall portion and a mounting portion, the side wall portion of the valve body is a side wall of the valve cavity or at least a part of the side wall of the valve cavity, the plurality of communicating holes are located in the side wall portion of the valve body, one side of the mounting portion of the valve body is fixedly connected to the side wall portion of the valve body, and the other side, away from the side wall portion, of the mounting portion of the valve body is provided with a mounting plane, and the mounting plane is provided with a valve port correspondingly in communication with the plurality of communicating holes.

6. The control valve of claim 5, further comprising a sealing gasket, wherein the sealing gasket is disposed between the first valve core and the side wall portion of the valve body, the sealing gasket is provided with a notch correspondingly in communication with the plurality of first flow channels, one surface of the sealing gasket in a thickness direction of the sealing gasket is in contact with and sealing fit with a surface of the first valve core, and the other surface of the sealing gasket in the thickness direction of the sealing gasket is sealingly connected to an inner surface of the side wall portion of the valve body.

7. The control valve of claim 5, further comprising a sealing cylinder, wherein the sealing cylinder is disposed between the second valve core and the side wall portion of the valve body, the sealing cylinder is correspondingly in communication with the plurality of second flow channels and the third passage, one end of the sealing cylinder is in contact with and sealingly matched with an outer surface of the second valve core, and the other end of the sealing cylinder is sealingly connected to an inner surface of the side wall portion.

8. The control valve of claim 1, wherein the second valve core comprises a side plate and an end plate, the side plate is in a circle shape, the end plate is disposed at one end of the side plate adjacent to the first valve core, and an accommodating cavity is formed by the side plate and the end plate being surrounded;

the side plate is provided with an open hole through which the second valve core is in communication with the plurality of second flow channels, the end plate is provided with an opening through which the second valve core is in communication with the plurality of second passages, and the third passage is formed by the open hole, the accommodating cavity and the opening.

9. The control valve of claim 1, further comprising a first transmission shaft, fixedly connected to the first valve core;

a second transmission shaft, fixedly connected to the second valve core, the second transmission shaft being sleeved outside of the first transmission shaft, and the second transmission shaft being coaxially disposed with the first transmission shaft;

a first actuator assembly coupled to the first transmission shaft to drive the first transmission shaft to rotate; and a second actuator assembly coupled to the second transmission shaft to drive the second transmission shaft to rotate.

10. The control valve of claim 9, wherein the first actuator assembly comprises a first motor component and a first reducer component, the first reducer component is connected to the first motor component and the first transmission shaft, the first motor component is capable of reducing an output rotational speed and driving the first transmission shaft to rotate through the first reducer component;

the second actuator assembly comprises a second motor component and a second reducer component, the second reducer component is connected to the second motor component to the second transmission shaft, the second motor component is capable of reducing an output rotational speed and driving the second transmission shaft to rotate through the second reducer component.

11. The control valve of claim 10, wherein the first motor component comprises a first motor and a first worm, the first worm is connected to an output shaft of the first motor, the first reducer component comprises a first worm gear, a first secondary gear, a first connecting gear and a first output gear connected in sequential mesh, the first worm gear is connected in mesh to the first worm, the first output gear is clamped to an end of the first transmission shaft extending out of the second transmission shaft;

the second motor component comprises a second motor and a second worm, the second worm is connected to an output shaft of the second motor, the second reduction component comprises a second worm gear, a second secondary gear, a second connecting gear and a second output gear connected in sequential mesh, the second worm gear is connected in mesh to the second worm, the second output gear is sleeved on a part of the first transmission shaft extending out of the second transmission shaft, and the second output gear is clamped to an end of the second transmission shaft away from the first valve core.

12. The control valve of claim 11, wherein the first secondary gear comprises a first large-diameter gear and a first small-diameter gear, the first large-diameter gear and the first small-diameter gear are coaxially provided and fixedly connected, a diameter of the first large-diameter gear is greater than that of the first small-diameter gear, the first large-diameter gear is connected in mesh with the first worm gear, the first small-diameter gear is connected in mesh with the first connecting gear; and/or the second secondary gear comprises a second large-diameter gear and a second small-diameter gear, the second large-diameter gear and the second small-diameter gear are coaxially provided and fixedly connected, a diameter of the second large-diameter gear is greater than that of the second small-diameter gear, the second large-diameter gear is connected in mesh with the second worm gear, the second small-diameter gear is connected in mesh with the second connecting gear.

13. The control valve of claim 11, further comprising a housing, wherein both the first actuator assembly and the second actuator assembly are disposed in the housing, the housing is provided with a transmission hole, the first output gear comprises a first gear portion and a first connection portion, the first gear portion is connected in mesh with the first connection gear, one end of the first connection portion is fixedly connected to the first gear portion and the other end of the first connection portion is connected to the first transmission shaft through the transmission hole, the second output gear comprises a second gear portion and a second connecting portion, the second gear portion is connected in mesh with the second connecting gear, one end of the second connecting portion is fixedly connected to the second gear portion and the other end of the second connecting portion is connected to the second transmission shaft through the transmission hole.

14. The control valve of claim 13, wherein a first sealing ring is provided between the first transmission shaft and the transmission hole and the first sealing ring is sleeved on the first transmission shaft;

and/or, a second sealing ring is provided between the second connection portion and the transmission hole and the second sealing ring is sleeved on the second connection portion.

15. A driver, applied in the control valve of claim 1, wherein the driver comprises a housing, an actuator mechanism, and at least two output wheels, the housing comprises a cavity, the actuator mechanism and the at least two output wheels are disposed in the cavity, the actuator mechanism is coupled to the at least two output wheels and configured for driving the at least two output wheels to rotate;

the at least two output wheels are respectively connected to and coaxially provided in correspondence with the first valve core and the second valve core, the at least two output wheels are capable of operating independently and driving the first valve core and the second valve core to rotate respectively.

16. The driver of claim 15, wherein the actuator mechanism at least comprises a second motor component and a second reducer component, the second reducer component is connected to the second motor component, the at least two output wheels comprise a second output gear, the second reducer component is connected to the second output gear, the second motor component is capable of reducing an output rotational speed and driving the second output gear to rotate through the second reducer component;

the actuator mechanism further comprises a first motor component and a first reducer component, the first reducer component is connected to the first motor component, the at least two output wheels further comprises a first output gear, the first output gear is connected to the first reducer component, the first motor component is capable of reducing an output rotational speed and driving the first output gear to rotate through the first reducer component.

17. The driver of claim 16, wherein the second motor component comprises a second motor and a second worm, the second worm is connected to an output shaft of the second motor, the second reduction component comprises a second worm gear, a second secondary gear, a second connecting gear and a second output gear connected in sequential mesh, the second worm gear is connected in mesh to the second worm, the second output gear is a cogwheel, and the second connecting gear is connected in mesh with the second output gear;

the first motor component comprises a first motor and a first worm, the first worm is connected to an output shaft of the first motor, the first reducer component comprises a first worm gear, a first secondary gear, a first connecting gear and a first output gear connected in sequential mesh, the first worm gear is connected in mesh to the first worm, the first output gear is a cogwheel, and the first connecting gear is connected in mesh with the first output gear.

18. The driver of claim 17, wherein the second output gear comprises a second gear portion and a second connecting portion, the second gear portion is connected in mesh with the second connecting gear, the second connecting portion is fixedly connected to the second gear portion;

the first output gear comprises a first gear portion and a first connection portion, the first gear portion is connected in mesh with the first connection gear, the first connection portion is fixedly connected to the first gear portion; and the second gear portion is sleeved on and connected to the first connecting portion through the second connecting portion.

19. The driver of claim 17, wherein the second secondary gear comprises a second large-diameter gear and a second small-diameter gear, the second large-diameter gear and the second small-diameter gear are coaxially provided and fixedly connected, a diameter of the second large-diameter gear is greater than that of the second small-diameter gear, the second large-diameter gear is connected in mesh with the second worm gear, and the second small-diameter gear is connected in mesh with the second connecting gear;

and/or, the first secondary gear comprises a first large-diameter gear and a first small-diameter gear, the first large-diameter gear and the first small-diameter gear are coaxially provided and fixedly connected, a diameter of the first large-diameter gear is greater than that of the first small-diameter gear, the first large-diameter gear is connected in mesh with the first worm gear, and the first small-diameter gear is connected in mesh with the first connecting gear.

\* \* \* \* \*